(12) United States Patent
Tanaka et al.

(10) Patent No.: US 12,128,734 B2
(45) Date of Patent: Oct. 29, 2024

(54) WORK VEHICLE

(71) Applicant: KUBOTA CORPORATION, Osaka (JP)

(72) Inventors: Ryosuke Tanaka, Sakai (JP); Kenzo Ushiro, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 338 days.

(21) Appl. No.: 17/542,796

(22) Filed: Dec. 6, 2021

(65) Prior Publication Data

US 2022/0203803 A1    Jun. 30, 2022

(30) Foreign Application Priority Data

Dec. 24, 2020  (JP) ................... 2020-215831

(51) Int. Cl.
| | |
|---|---|
| *B60H 1/00* | (2006.01) |
| *B60R 21/11* | (2006.01) |
| *B60R 21/13* | (2006.01) |
| *B62D 33/06* | (2006.01) |
| *B62D 49/06* | (2006.01) |

(52) U.S. Cl.
CPC ..... *B60H 1/00564* (2013.01); *B60H 1/00378* (2013.01); *B60R 21/11* (2013.01); *B62D 33/0621* (2013.01); *B62D 33/0625* (2013.01); *B62D 49/0671* (2013.01)

(58) Field of Classification Search
CPC ...... B62D 3/06; B62D 3/0617; B62D 3/0621; B62D 3/0625; B60R 21/11; B60R 21/13; B60R 21/131; B60R 21/134; B60H 1/00378; B60H 1/00564
See application file for complete search history.

(56) References Cited

U.S. PATENT DOCUMENTS

| | | | | |
|---|---|---|---|---|
| 3,776,358 A | * | 12/1973 | Williams ........... | B60H 1/00378 180/84 |
| 5,839,758 A | * | 11/1998 | Finch ................ | B60R 21/131 280/756 |
| 6,290,286 B1 | * | 9/2001 | Murakami ......... | B60H 1/00378 296/208 |
| 6,398,294 B1 | * | 6/2002 | Bollweg ............ | B60H 1/00378 296/190.09 |
| 6,843,717 B1 | * | 1/2005 | Bennett ............. | B60H 1/00564 128/204.15 |

(Continued)

FOREIGN PATENT DOCUMENTS

| | | |
|---|---|---|
| JP | 2000-016788 A | 1/2000 |
| JP | 2001-010335 A | 1/2001 |
| JP | 2005-239005 A | 9/2005 |

*Primary Examiner* — Gregory A Blankenship
(74) *Attorney, Agent, or Firm* — Keating & Bennett, LLP

(57) ABSTRACT

A work vehicle includes a driver section including a driver seat, an air conditioner, and a duct to supply conditioned air from the air conditioner. The air conditioner is below an upper end of the driver seat. The duct includes a vertical portion extending upward from the air conditioner and rearward of the driver seat, and a horizontal portion extending from an upper end portion of the vertical portion to a position forward of the driver in the driver seat in a side view. The duct includes, at a portion forward of the driver, an outlet to blow conditioned air toward the driver.

6 Claims, 13 Drawing Sheets

(56) References Cited

U.S. PATENT DOCUMENTS

| | | | | |
|---|---|---|---|---|
| 6,857,955 | B1* | 2/2005 | Held | B60H 1/00564 |
| | | | | 454/143 |
| 6,884,159 | B1* | 4/2005 | Ferraud, Jr. | B60H 1/00564 |
| | | | | 454/119 |
| 10,131,206 | B1* | 11/2018 | Kirkpatrick | B60H 1/00407 |
| 2005/0168007 | A1* | 8/2005 | Westendorf | B62D 33/0621 |
| | | | | 296/102 |
| 2007/0252371 | A1* | 11/2007 | Schlup | B60R 21/131 |
| | | | | 280/756 |
| 2014/0083784 | A1* | 3/2014 | Fukunaga | B60H 1/00378 |
| | | | | 903/903 |
| 2015/0218778 | A1* | 8/2015 | Kimura | B60H 1/00378 |
| | | | | 296/190.09 |
| 2016/0236640 | A1* | 8/2016 | Bartel | F16C 11/10 |
| 2018/0037183 | A1* | 2/2018 | Bartel | A01D 75/20 |
| 2018/0037869 | A1* | 2/2018 | Suh | A61P 11/02 |
| 2019/0161131 | A1* | 5/2019 | Barimani | E02F 9/166 |
| 2020/0079175 | A1* | 3/2020 | Fiocchi | B60H 3/0608 |
| 2020/0392699 | A1* | 12/2020 | Sutar | E02F 9/163 |
| 2021/0276392 | A1* | 9/2021 | Fujikawa | B60H 1/00378 |
| 2021/0291616 | A1* | 9/2021 | Yasunobe | B62D 25/04 |
| 2022/0203803 | A1* | 6/2022 | Tanaka | B60H 1/245 |
| 2022/0204098 | A1* | 6/2022 | Kobayashi | B62D 21/14 |
| 2022/0332228 | A1* | 10/2022 | Park | B60H 3/0085 |

\* cited by examiner

WORK VEHICLE

CROSS REFERENCE TO RELATED APPLICATIONS

This application claims the benefit of priority to Japanese Patent Application No. 2020-215831 filed on Dec. 24, 2020. The entire contents of this application are hereby incorporated herein by reference.

BACKGROUND OF THE INVENTION

1. Field of the Invention

The present invention relates to a work vehicle including an air conditioner for a driver section.

2. Description of the Related Art

For example, a work vehicle described in JP 2000-16788A is already known as a work vehicle such as that described above. This work vehicle ("battery-powered forklift" in JP 2000-16788A) includes a head guard that covers the driver seat. Also, an air conditioner is mounted on the ceiling portion of the head guard.

JP 2000-16788A is an example of related art.

SUMMARY OF THE INVENTION

In the work vehicle described in JP 2000-16788A, the air conditioner is arranged at a relatively high position. As a result, the position of the center of gravity of the work vehicle tends to be relatively high. As a result, the orientation of the work vehicle tends to be unstable.

Here, in the work vehicle described in JP 2000-16788A, it is conceivable that the position of the air conditioner is changed to a relatively low position. However, a situation is envisioned in which, depending on the position of the air conditioner after the change, the field of view in front of the driver will narrow.

For example, in a configuration in which the air conditioner is arranged at the front portion of the body, a situation is envisioned in which the field of view in front of the driver is narrow due to the air conditioner, a duct connected to the air conditioner, and the like.

Preferred embodiments of the present invention provide work vehicles each capable of supplying conditioned air to a vicinity of the driver, in which the orientation of the body is stable and the field of view in front of the driver is not likely to be narrowed.

According to a preferred embodiment of the present invention, a work vehicle includes a driver section including a driver seat, an air conditioner, and a duct to supply conditioned air from the air conditioner, in which the air conditioner is below an upper end of the driver seat, the duct includes a vertical portion extending upward from the air conditioner and rearward of the driver seat, and a horizontal portion extending from an upper end portion of the vertical portion to a position forward of a driver in the driver seat in a plan view, and the duct includes, at a portion forward of the driver, an outlet to blow the conditioned air toward the driver.

With a preferred embodiment of the present invention, conditioned air can be supplied to a vicinity of the driver from the outlet of the duct.

Also, in a preferred embodiment of the present invention, the air conditioner may be below the upper end of the driver seat. For this reason, the position of the air conditioner is lower compared to the case where the air conditioner is provided above the upper end of the driver seat. As a result, the position of the center of gravity of the work vehicle is comparatively lower. As a result, the orientation of the body is stable.

Moreover, the vertical portion extends upward at a position rearward of the driver seat. For this reason, a situation is less likely to occur in which the field of view in front of the driver is narrowed due to the vertical portion, compared with the case where the vertical portion extends upward at a position in front of the driver seat.

That is, with a preferred embodiment of the present invention, it is possible to realize a work vehicle capable of supplying conditioned air to the vicinity of the driver, in which the orientation of the body is stable and the field of view in front of the driver is not likely to be narrowed.

Furthermore, in a preferred embodiment of the present invention, it is preferable that the horizontal portion extends above the driver's head in a side view.

According to this configuration, a situation is less likely to occur in which the field of view in the left-right direction of the driver is narrowed due to the horizontal portion, compared to the configuration in which the horizontal portion extends through the same height position as the driver's head. As a result, it is possible to realize a work vehicle having a favorable field of view in the left-right direction of the driver.

Furthermore, in a preferred embodiment of the present invention, it is preferable to include a support to support the duct in the driver section and having a position and an orientation at least one of which is changeable, in which the duct includes a flexible member, and the outlet has a position and an orientation at least one of which is changes in response to a change in the support.

According to this configuration, it is possible to realize a work vehicle capable of changing at least one of the position and the direction of the outlet without providing a dedicated member for changing at least one of the position and the direction of the outlet. As a result, the manufacturing cost is easily reduced.

Also, in a preferred embodiment of the present invention, it is preferable that the outlet is at a front end portion of the duct, and a front portion of the duct is retractable to a position rearward of a front end portion of the driver seat in response to a change in the support.

According to this configuration, in a state in which the front portion of the duct has retracted to a position rearward of the front end portion of the driver seat, the front portion of the duct is less likely to impede a movement in which the driver sits in the driver seat and a movement in which the driver stands up from the driver seat. As a result, it is possible to realize a work vehicle in which the driver easily and smoothly performs a movement of sitting in the driver seat and a movement of standing up from the driver seat.

Furthermore, in a preferred embodiment of the present invention, it is preferable that the support is changeable so as to extend in a front-rear direction at a position lateral to and above the driver's head.

According to this configuration, if the support is in a state of extending in the front-rear direction on the side above the driver's head, the support is not likely to impede the movement in which the driver sits in the driver seat and the movement in which the driver stands up from the driver seat. As a result, it is possible to realize a work vehicle in which the driver easily and smoothly performs a movement of sitting in the driver seat and a movement of standing up from the driver seat.

Furthermore, in a preferred embodiment of the present invention, it is preferable to include a roof portion covering the driver section from above, and a roof frame supporting the roof portion, in which the support is supported by the roof frame.

In general, the roof frame that supports the roof portion is relatively strong.

Here, according to the above-described configuration, the duct is supported by the roof frame via the support. That is, the duct is supported by a relatively strong roof frame. As a result, the duct is stably supported.

Furthermore, in a preferred embodiment of the present invention, it is preferable that the roof portion is a canopy, the work vehicle further includes a protective frame standing at a rear portion of the driver section, and the roof frame is supported by an upper portion of the protective frame.

In general, the protective frame provided in a standing orientation from the rear portion of the driver section is relatively strong.

Here, according to the above-described configuration, the duct is supported by the protective frame via the support and the roof frame. That is, the duct is supported by a relatively strong protective frame. As a result, the duct is stably supported.

Furthermore, in a preferred embodiment of the present invention, it is preferable to include a protective frame standing at a rear portion of the driver section, in which the protective frame has an orientation changeable between a standing use orientation and an inclined orientation, in which the protective frame is inclined rearward from the use orientation, and the vertical portion includes a flexible member, and is supported by the protective frame and extending along the protective frame.

In general, the protective frame provided in a standing manner from the rear portion of the driver section is relatively strong.

Here, according to the above-described configuration, the vertical portion is supported by the protective frame. As a result, the vertical portion is stably supported.

Moreover, according to the above-described configuration, the vertical portion includes a flexible member. For this reason, the vertical portion deforms according to a change in the orientation of the protective frame. That is, it is possible to avoid a situation in which the vertical portion hinders the change in orientation of the protective frame.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a vertical cross-sectional front view showing a configuration of an air conditioner and the like.
FIG. 4 is a partially broken rear view showing the configuration of the air conditioner and the like.
FIG. 6 is a left side view showing the configuration of a converter and the like.
FIG. 7 is a left side view showing the configuration of the air conditioner and the like.
FIG. 8 is a left side view showing a configuration of a duct and the like.
FIG. 9 is a plan view showing the configuration of the duct and the like.
FIG. 11 is a partially broken plan view showing the configuration of the air conditioner and the like.
FIG. 12 is a plan view showing the configuration of the duct and the like.
FIG. 13 is a left side view showing a configuration of a duct support and the like.
FIG. 14 is a bottom view showing the configuration of the duct support and the like.

DETAILED DESCRIPTION OF THE PREFERRED EMBODIMENTS

Preferred embodiments of the present invention will be described with reference to the drawings. Note that in the following description, the direction of arrow F in FIGS. 1, 2, 6 to 9, and 11 to 14 is front, the direction of arrow B in the same drawings is rear, the direction of arrow L in FIGS. 2 to 5, 9 to 12, and 14 is left, and the direction of arrow R in the same drawings is right. Also, the direction of arrow U in FIGS. 1, 3 to 8, 10, and 13, is up, and the direction of arrow D in the same drawings is down.

Figure 1:
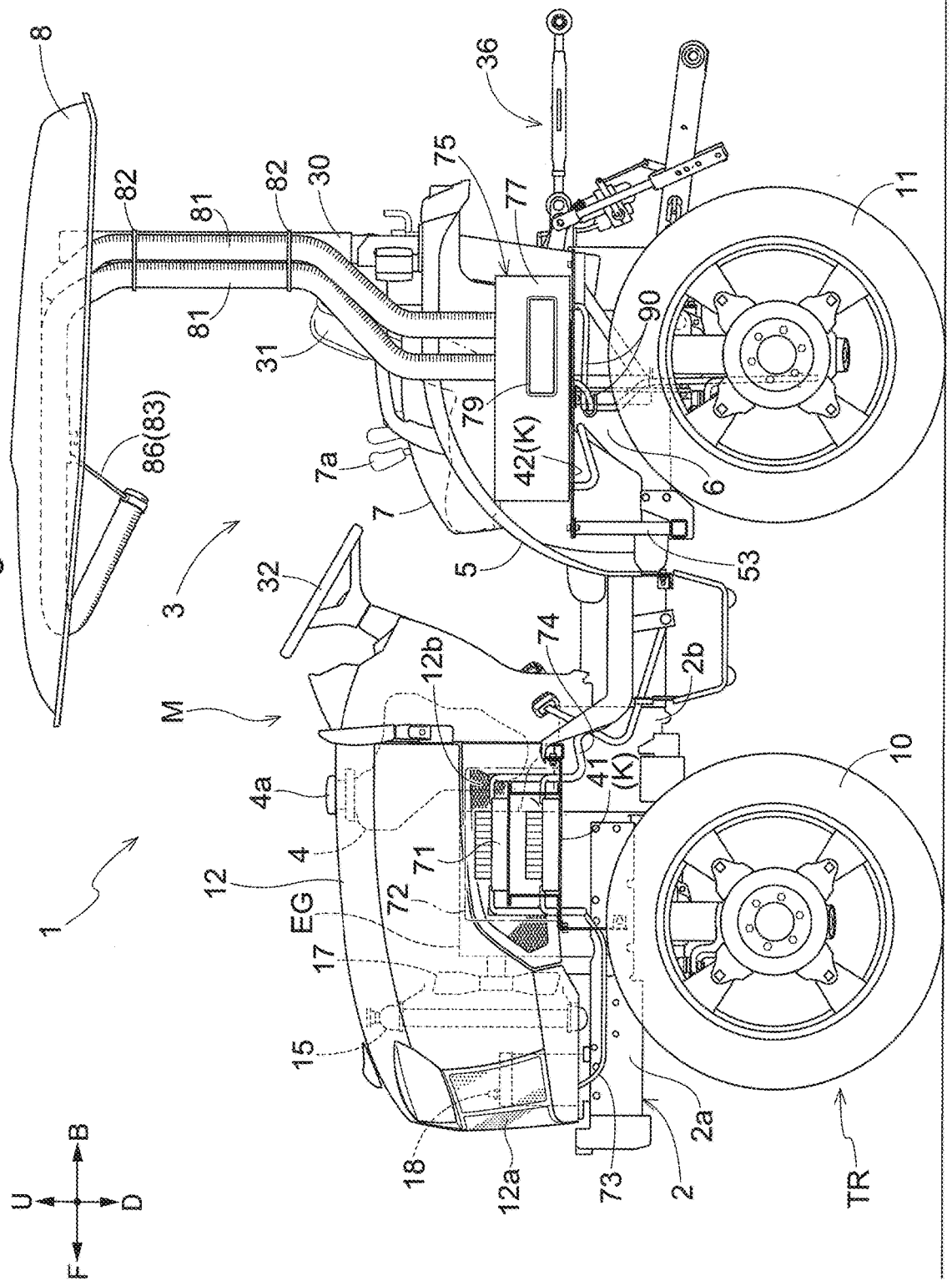
FIG. 1 is a left side view of a tractor.
Figure 2:
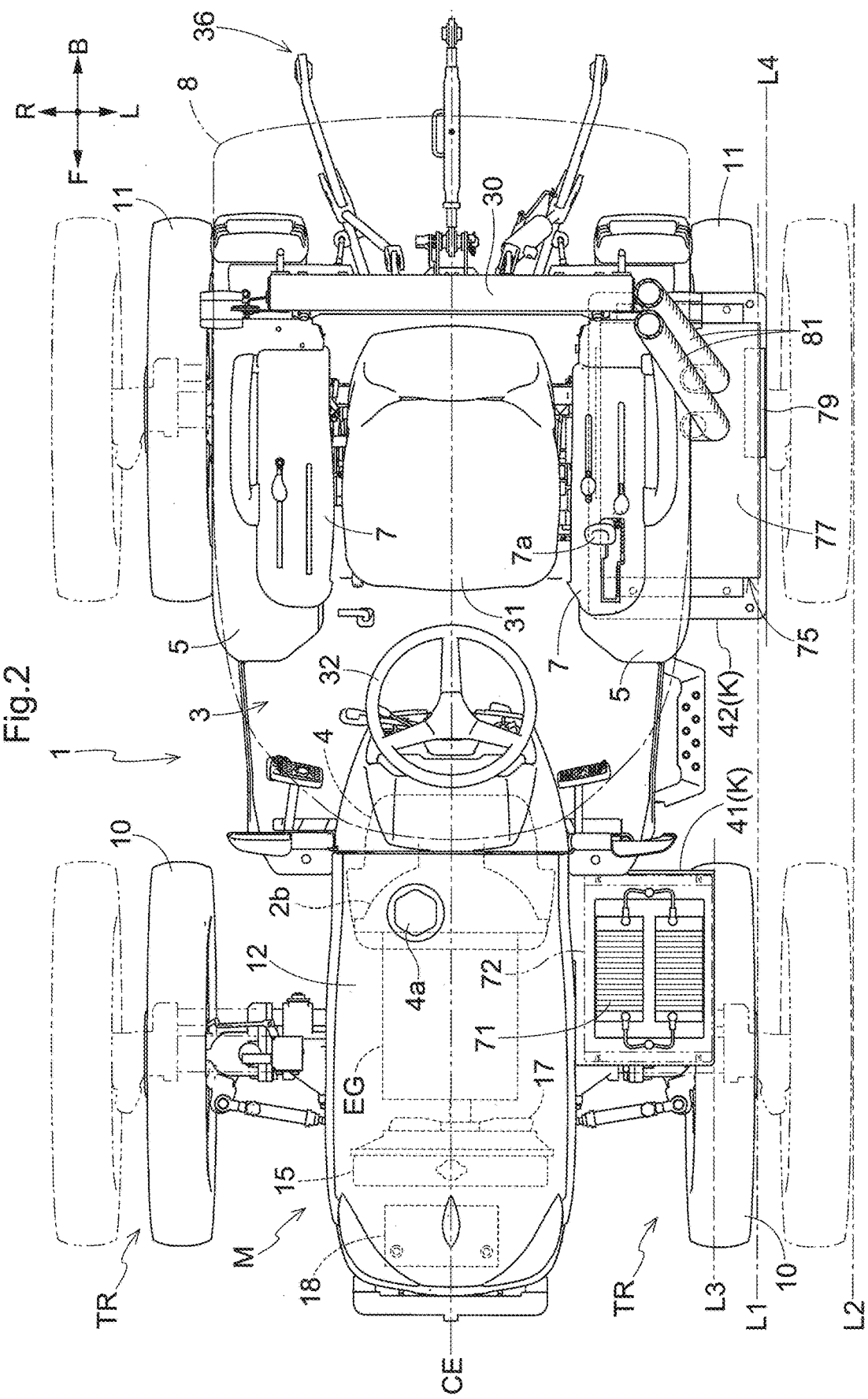
FIG. 2 is a plan view of the tractor.

As shown in FIGS. 1 and 2, the tractor 1 (corresponding to a "working vehicle") includes a body frame 2, a main body M, and left and right travel devices TR.

The body frame 2 extends in the front-rear direction of the body. Also, the body frame 2 is supported by the left and right travel devices TR. Also, the body frame 2 supports the main body M. That is, the left and right travel devices TR support the main body M via the body frame 2.

As described above, the tractor 1 includes the main body M supported by the body frame 2. Also, the tractor 1 includes the left and right travel devices TR that support the main body M.

Note that the body of the tractor 1 includes the body frame 2 and the main body M. The body of the tractor 1 is supported by the left and right travel devices TR.

Each travel device TR includes a front wheel 10 and a rear wheel 11. The front wheel 10 and the rear wheel 11 are both wheels.

That is, the travel device TR is provided with the front wheel 10 and the rear wheel 11. Also, in the present preferred embodiment, the left and right travel devices TR are the left and right front wheels 10 and rear wheels 11.

Also, the main body M includes a driver section 3 and an engine hood 12. That is, the driver section 3 is supported by the body frame 2. The engine hood 12 is at the front portion of the body. Also, the driver section 3 is rearward of the engine hood 12.

The driver section 3 includes a driver seat 31 and a steering wheel 32. A driver can be seated in the driver seat 31. Then, the driver can perform various driving operations in the driver section 3. For example, operating the steering wheel 32 causes the left and right front wheels 10 to change their respective directions.

As described above, the tractor 1 includes the driver section 3. Also, the driver section 3 includes the driver seat 31. In other words, the tractor 1 includes the driver section 3 including the driver seat 31.

As shown in FIG. 1, the engine hood 12 accommodates an engine EG, a fuel tank 4, a radiator 15, a cooling fan 17, and a battery 18.

In other words, the tractor 1 includes an engine hood 12 to accommodate an engine EG at the front portion of the body.

The fuel tank 4 stores fuel. A refueling section 4a of the fuel tank 4 protrudes upward from the upper surface of the engine hood 12. Fuel can be replenished in the fuel tank 4 from the refueling section 4a. The fuel stored in the fuel tank 4 is supplied to the engine EG.

Here, the body frame 2 includes left and right main frames 2a and a power transmission device 2b. Each main frame 2a is a plate-shaped member in a vertical orientation and extends in the front-rear direction of the body. The front portion of the power transmission device 2b is fixed to the rear portions of the left and right main frames 2a. The power transmission device 2b extends in the front-rear direction of the body. In the present preferred embodiment, the power transmission device 2b has a hydrostatic, continuously variable transmission. Also, a transmission 6 is supported at the rear end portion of the power transmission device 2b.

Also, the driving force of the engine EG is transmitted to the transmission 6 via the power transmission device 2b. The power transmission device 2b and the transmission 6 change the speed of the driving force received from the engine EG and transmit the resulting driving force to the left and right front wheels 10 and the left and right rear wheels 11. As a result, the left and right front wheels 10 and the left and right rear wheels 11 are driven.

Also, a link mechanism 36 is provided at the rear end portion of the tractor 1. The link mechanism 36 is configured such that a work device such as a tilling device (not shown) can be attached thereto. Then, the transmission 6 transmits some of the driving force received from the engine EG to the work device via a PTO shaft (not shown).

As described above, the tractor 1 includes the transmission 6 supported by the body frame 2.

According to the above-described configuration, the tractor 1 can perform work using the work device while traveling using the left and right front wheels 10 and the left and right rear wheels 11. For example, in a ridged field, the tractor 1 can perform an intertilling task while traveling with the left and right front wheels 10 and the left and right rear wheels 11 located in the ridges.

The tractor 1 also includes a cooling water path for cooling the engine EG. The radiator 15 is included in this cooling water path. A water pump (not shown) pumps the cooling water to cause the cooling water to circulate through this cooling water path. Then, the cooling water is cooled as it extends through the radiator 15.

The radiator 15 is in front of the engine EG. A cooling fan 17 is between the radiator 15 and the engine EG in the front-rear direction of the body.

Here, as shown in FIG. 1, the engine hood 12 includes an introduction section 12a. The introduction section 12a is configured such that outside air can be introduced into the engine hood 12. The introduction section 12a is at the front end portion of the engine hood 12.

In the present preferred embodiment, the introduction section 12a includes a plurality of small holes. However, preferred embodiments of the present invention are not limited to this, and the introduction section 12a may be in any other form. For example, the introduction section 12a may also be in the form of a single hole. Also, the introduction section 12a may include an air blower for introducing outside air.

Also, the engine hood 12 includes left and right exhaust grille portions 12b. The left and right exhaust grille portions 12b are configured such that the air inside the engine hood 12 can be discharged to the outside.

The left exhaust grille portion 12b is at the left side portion of the engine hood 12. Also, the right exhaust grille portion 12b is at the right side portion of the engine hood 12.

The left exhaust grille portion 12b is leftward of the engine EG. Also, the right exhaust grille 12b is rightward of the engine EG. That is, the left and right exhaust grille portions 12b are on respective lateral sides of the engine EG.

In the present preferred embodiment, the left and right exhaust grille portions 12b are each in the form of a plurality of small holes. However, preferred embodiments of the present invention are not limited to this, and the left and right exhaust grille portions 12b may have any other form. For example, the left and right exhaust grille portions 12b may each be in the form of a single hole. Also, the left and right exhaust grille portions 12b may each include an air blower to discharge air.

The cooling fan 17 sends cooling air rearward. As a result, outside air is introduced into the engine hood 12 via the introduction section 12a and extends through the radiator 15. As a result, the radiator 15 is cooled.

At least some of the cooling air sent from the cooling fan 17 to the front portion of the engine EG flows around to the left and right of the engine EG and is discharged from the left and right exhaust grille portions 12b. As a result, the front portion and the lateral side portions of the engine EG are cooled.

In this manner, the exhaust grille portions 12b for discharging the cooling air after cooling the engine EG are provided on the lateral side portions of the engine hood 12.

Also, the battery 18 stores electric power and is configured to supply electric power to other devices. The battery 18 is forward of the radiator 15.

As described above, the engine hood 12 to accommodate the engine EG and the battery 18 is provided at the front portion of the body.

Also, as shown in FIGS. 1 and 2, the main body M includes left and right fenders 5. As shown in FIG. 2, the left fender 5 is leftward of the driver seat 31. The right fender 5 is rightward of the driver seat 31.

As shown in FIG. 1, the left fender 5 is above the left rear wheel 11 in a side view. Also, although not shown in FIG. 1, the right fender 5 is above the right rear wheel 11 in a side view.

That is, the tractor 1 includes left and right fenders 5 above the travel device TR in a side view.

As shown in FIG. 2, the left and right rear wheels 11 protrude outward in the left-right direction of the body relative to the left and right fenders 5. More specifically, the left rear wheel 11 protrudes leftward from the left fender 5. Also, the right rear wheel 11 protrudes rightward from the right fender 5.

That is, the travel device TR protrudes outward in the left-right direction of the body from the fenders 5.

As shown in FIGS. 1 and 2, the tractor 1 includes left and right side panels 7. The left side panel 7 is supported at the upper surface portion of the left fender 5 and overlaps with the left fender 5 in a plan view. Also, the right side panel 7 is supported at the upper surface portion of the right fender 5 and overlaps with the right fender 5 in a plan view.

The left and right side panels 7 are provided with various operation levers. In particular, as shown in FIG. 2, the left side panel 7 is provided with a speed change lever 7a. The speed change lever 7a is linked to the hydrostatic, continuously variable transmission in the power transmission device 2b. That is, operating the speed change lever 7a changes how the power transmission device 2b changes the speed.

As shown in FIGS. 1 and 2, the tractor 1 is a cab-less machine (cabin-less machine). That is, the tractor 1 does not include a cabin. Also, the surrounding area of the driver seat 31 is open to the exterior of the body.

Also, the tractor 1 includes a arch-shaped protective frame 30. The protective frame 30 stands on the rear portion of the driver section 3.

That is, the tractor 1 includes the protective frame 30 standing on the rear portion of the driver section 3.

Also, the tractor 1 includes a roof portion 8. The roof portion 8 covers the driver section 3 from above.

That is, the tractor 1 includes the roof portion 8 covering the driver section 3 from above.

In this preferred embodiment, the roof portion 8 is a canopy. Also, the roof portion 8 is supported at the upper portion of the protective frame 30.

Hereinafter, the structure of the portion connecting the body frame 2 and the left and right rear wheels 11 will be described with reference to FIGS. 3 and 4. Note that the following description also similarly applies to the structure of the portion connecting the body frame 2 and the left and right front wheels 10.

As described above, the transmission 6 is supported at the rear end portion of the body frame 2. Also, as shown in FIGS. 3 and 4, the tractor 1 includes left and right axle cases 20. The left axle case 20 connects the transmission 6 and the left rear wheel 11 to each other. Also, the right axle case 20 connects the transmission 6 and the right rear wheel 11 to each other.

That is, the tractor 1 includes the left and right axle cases 20 connecting the transmission 6 and the left and right rear wheels 11 to each other.

The axle cases 20 each include a horizontal case portion 21 and a vertical case portion 22. The horizontal case portion 21 extends outward from the transmission 6 in the left-right direction of the body. More specifically, the left horizontal case portion extends leftward from the transmission 6. Also, the right horizontal case portion 21 extends rightward from the transmission 6.

Figure 4:
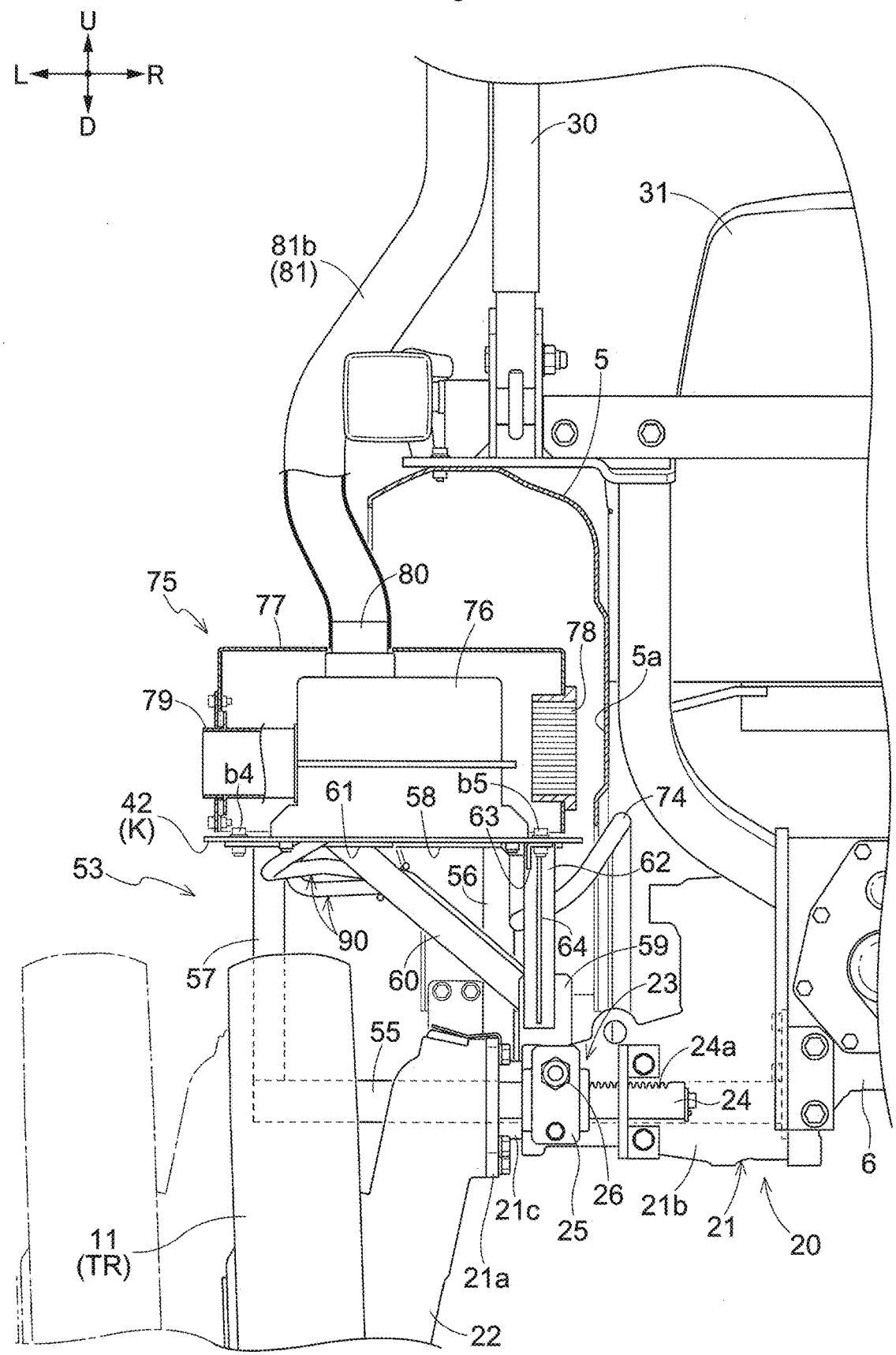

As shown in FIG. 4, the vertical case portion 22 extends downward from a free end portion 21a of the horizontal case portion 21. Also, the rear wheel 11 is supported at the lower end portion of the vertical case portion 22.

That is, the axle case 20 includes (i) the horizontal case portion 21 extending outward from the transmission 6 in the left-right direction of the body and (ii) the vertical case portion extending downward from the free end portion 21a of the horizontal case portion 21 and including a lower end portion at which the rear wheel 11 is supported.

Here, as shown in FIG. 4, the horizontal case portion 21 includes a case main body 21b and a slide portion 21c. The case main body 21b is fixed to the transmission 6.

The slide portion 21c is in the shape of a cylinder extending in the left-right direction of the body. Also, the slide portion 21c is inserted in the case main body 21b from outward in the left-right direction of the body. Also, the slide portion 21c can slide in the left-right direction of the body relative to the case main body 21b.

Note that the above-described free end portion 21a is an end portion on the outer side of the slide portion 21c in the left-right direction of the body.

Also, the horizontal case portion 21 is provided with a tread changing device 23. The tread changing device 23 is configured to change the extension length of the horizontal case portion 21.

That is, the tread changing device 23 is provided in the horizontal case portion 21 and configured to change the extension length of the horizontal case portion 21.

More specifically, the tread changing device 23 includes an operating shaft 24, a shaft holding portion 25, and an operating nut 26. The operating shaft 24 extends in the left-right direction of the body, and extends between the case main body 21b and the slide portion 21c.

The shaft holding portion 25 is fixed to the case main body 21b. Also, the end portion on the outer side of the operating shaft 24 in the left-right direction of the body is coupled to the slide portion 21c. Also, the operating shaft 24 extends through the shaft holding portion 25 in the left-right direction.

A plurality of rack gear teeth 24a are provided on the upper surface of the operating shaft 24. The plurality of rack gear teeth 24a are arranged in the longitudinal direction of the operating shaft 24. Also, a pinion gear (not shown) is inside the shaft holding portion 25. This pinion gear engages with the plurality of rack gear teeth 24a.

The operating nut 26 is on the shaft holding portion 25. The operating nut 26 is linked to the above-described pinion gear. Rotating the operating nut 26 rotates the pinion gear. In response to this, the operating shaft 24 moves in the left-right direction of the body. As a result, the slide portion 21c slides in the left-right direction of the body with respect to the case main body 21b integrally with the operating shaft 24. As a result, the extension length of the horizontal case portion 21 changes.

Figure 3:
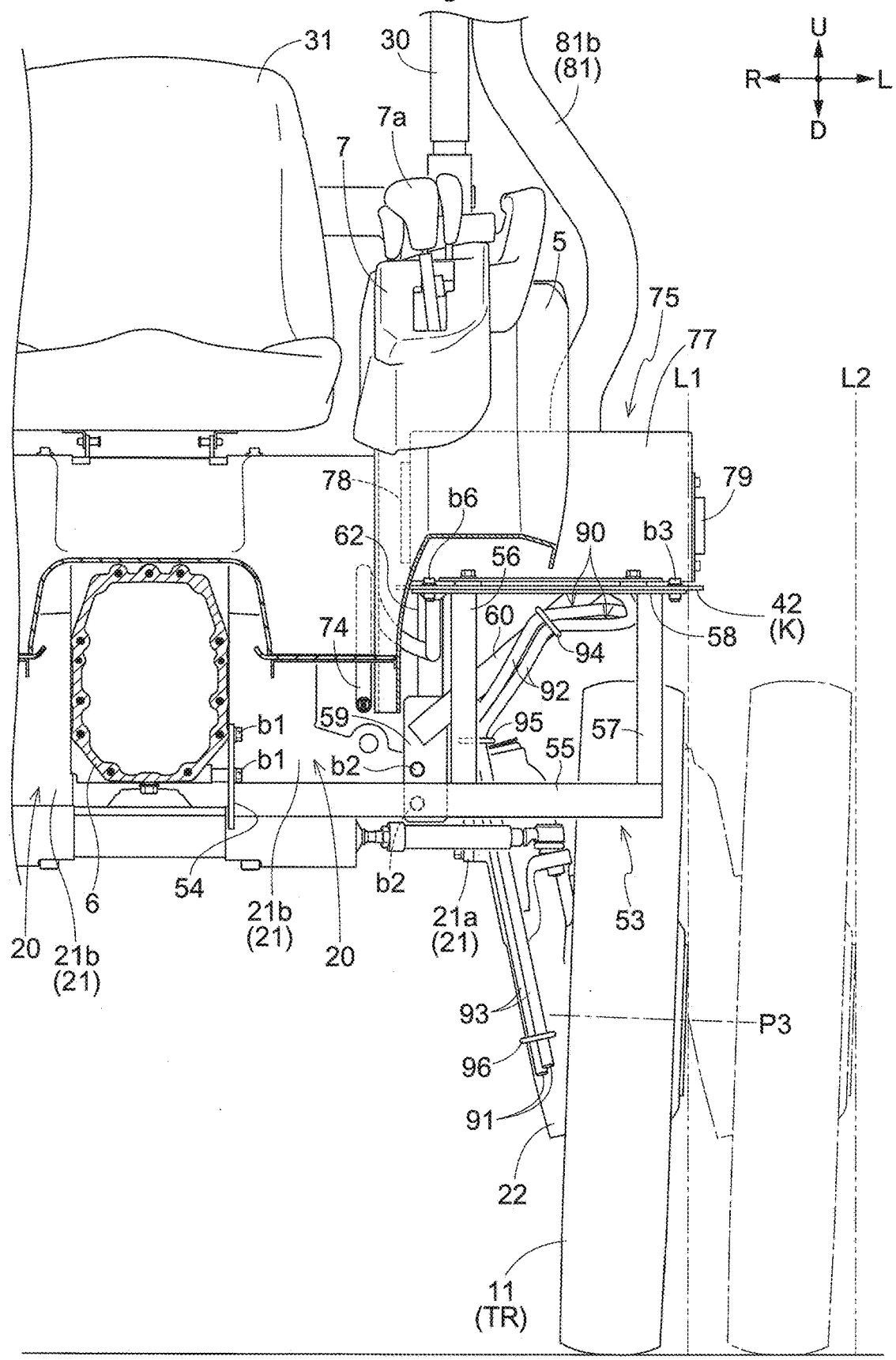

As the extension length of the horizontal case portion 21 changes, the left and right rear wheels 11 move in the left-right direction with respect to the transmission 6, as shown in FIGS. 2 to 4. That is, as the extension length of the horizontal case portion 21 changes, the left and right rear wheels 11 move in the left-right direction with respect to the body frame 2. As a result, the tread of the left and right rear wheels 11 changes. That is, the tread changing device 23 changes the tread of the left and right rear wheels 11. Similarly, the tread of the left and right front wheels 10 are also changed by the tread changing device 23.

That is, the tractor 1 includes a tread changing device 23 that changes the tread of the left and right travel devices TR by moving the travel devices TR in the left-right direction of the body with respect to the body frame 2.

In this manner, the tractor 1 includes the driver section 3, the body frame 2 supporting the driver section 3, the left and right travel devices TR supporting the body frame 2, and the tread changing device 23 configured to change the tread of the left and right travel devices TR by moving the travel devices TR in the left-right direction of the body with respect to the body frame 2.

Note that in FIGS. 2 to 5, the left and right travel devices TR or the left travel device TR in the state where the tread is the narrowest are indicated by solid lines. Also, the left and right travel devices TR or the left travel device TR in the state where the tread is the widest are indicated by virtual lines.

As shown in FIGS. 1 and 2, the tractor 1 includes a plurality of decks K. Each deck K is in the shape of a plate in a horizontal orientation. In the present preferred embodiment, the number of decks K is two, for example. However, the present invention is not limited thereto, and the number of decks K may be one or three or more.

The plurality of decks K include a front deck 41 and a rear deck 42. That is, both the front deck 41 and the rear deck 42 are decks K.

Both the front deck 41 and the rear deck 42 protrude outward from the main body M. More specifically, both the front deck 41 and the rear deck 42 protrude leftward from the main body M. Also, both the front deck 41 and the rear deck 42 are to the left of the body.

That is, the tractor 1 includes decks K protruding outward from the main body M. Also, the decks K are on one lateral side in the left-right direction of the body.

FIG. 2 shows a first left end position L1, a second left end position L2, a third left end position L3, and a fourth left end position L4. The first left end position L1 is the position of the left end of the left travel device TR in the state where the tread is the narrowest. The second left end position L2 is the position of the left end of the left travel device TR in the state where the tread is widest. The third left end position L3 is the position of the left end of the front deck 41. The fourth left end position L4 is the position of the left end of the rear deck 42.

As shown in FIG. 2, the first left end position L1 is rightward of the second left end position L2 relative to the body. That is, the first left end position L1 is located closer to the center of the body in the left-right direction of the body than the second left end position L2 is.

Also, the third left end position L3 is rightward of the first left end position L1 relative to the body. That is, the third left end position L3 is located closer to the center of the body in the left-right direction of the body than the first left end position L1 is. In other words, the lateral outer end of the front deck 41 is located closer to the center of the body in the left-right direction of the body than the lateral outer end of the left travel device TR in the state where the tread is the narrowest.

That is, the front deck 41, which is a deck K, is provided toward the center of the body in the left-right direction of the body relative to the lateral outer end portion of the travel device TR on one side in the left-right direction of the body.

Also, the fourth left end position L4 is leftward of the first left end position L1 relative to the body. That is, the fourth left end position L4 is outward of the first left end position L1 in the left-right direction of the body relative to the body. In other words, the lateral outer end of the rear deck 42 is outward in the left-right direction of the body relative to the lateral outer end portion of the left travel device TR in the state where the tread is the narrowest.

Also, the fourth left end position L4 is rightward of the second left end position L2 relative to the body. That is, the fourth left end position L4 is toward the center of the body in the left-right direction of the body relative to the second left end position L2. In other words, the lateral outer end of the rear deck 42 is toward the center of the body in the left-right direction of the body relative to the lateral outer end portion of the left travel device TR in the state where the tread is the widest.

That is, the rear deck 42, which is a deck K, is toward the center of the body in the left-right direction of the body relative to the lateral outer end portion of the travel device TR on one side in the left-right direction of the body in the state where the tread of the left and right travel devices TR is the widest.

Note that preferred embodiments of the present invention are not limited to the above-described configuration. The rear deck 42, which is a deck K, may also be toward the center of the body in the left-right direction of the body relative to the lateral outer end portion of the travel device TR on one side in the left-right direction of the body in the state where the tread of the left and right travel devices TR is the narrowest.

As shown in FIG. 1, both the front deck 41 and the rear deck 42 are at respective positions higher than the travel devices TR.

That is, the decks K are at respective positions higher than the travel devices TR.

As shown in FIG. 2, the front deck 41 is above the front wheel 10 on the left side of the body and overlaps with the front wheel 10 on the left side of the body in a plan view when the tread of the left and right travel devices TR is the narrowest. Also, the rear deck 42 is above the rear wheel 11 on the left side of the body and overlaps with the rear wheel 11 on the left side of the body in a plan view when the tread of the left and right travel devices TR is the narrowest.

That is, the plurality of decks K include (i) the front deck 41, which is a deck K disposed above the front wheel 10 on one side in the left-right direction of the body and overlapping with that one of the left and right front wheels 10 which is on one side in the left-right direction of the body in a plan view, and (ii) the rear deck 42, which is a deck K disposed above the rear wheel on one side in the left-right direction of the body and overlapping with that one of the left and right rear wheels 11 which is on one side in the left-right direction of the body in a plan view.

As shown in FIG. 2, the rear deck 42 is below the fender 5 on the left side of the body and overlaps with the fender 5 on the left side of the body in a plan view.

That is, the rear deck 42, which is a deck K, is below the fender 5 on one side in the left-right direction of the body and overlaps with that one of the left and right fenders 5 which is on one side in the left-right direction of the body in a plan view.

Also, as shown in FIGS. 1 and 2, the rear deck 42 is between the rear wheel 11 on the left side of the body and the fender 5 on the left side of the body in the up-down direction of the body.

That is, the rear deck 42, which is a deck K, is between the travel device TR on one side in the left-right direction of the body and the fender 5 on one side in the left-right direction of the body, in the up-down direction of the body.

In this preferred embodiment, each deck K is supported by the body frame 2. The support structure of each deck K will be described below.

Figure 5:
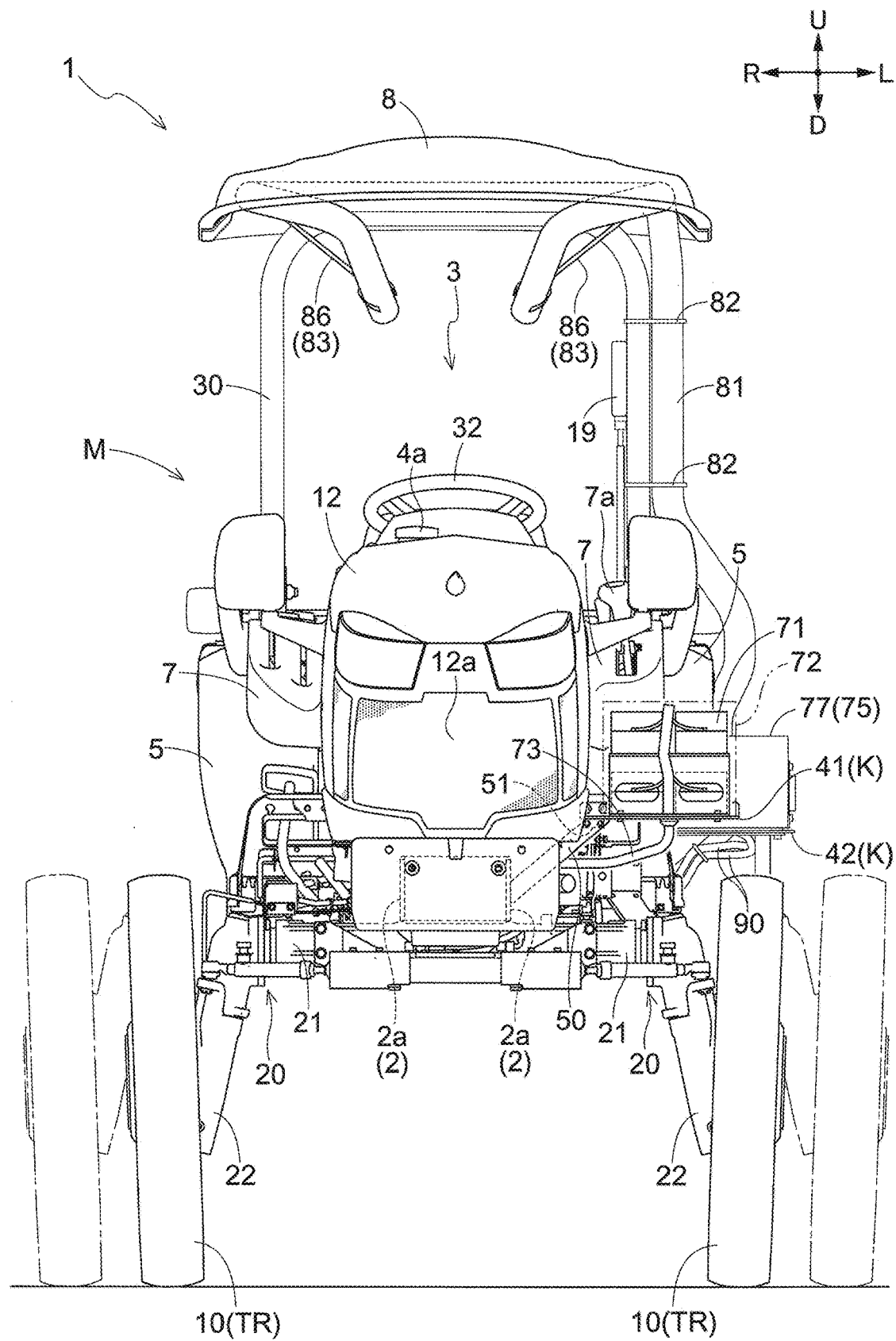
FIG. 5 is a front view of the tractor.
Figure 6:
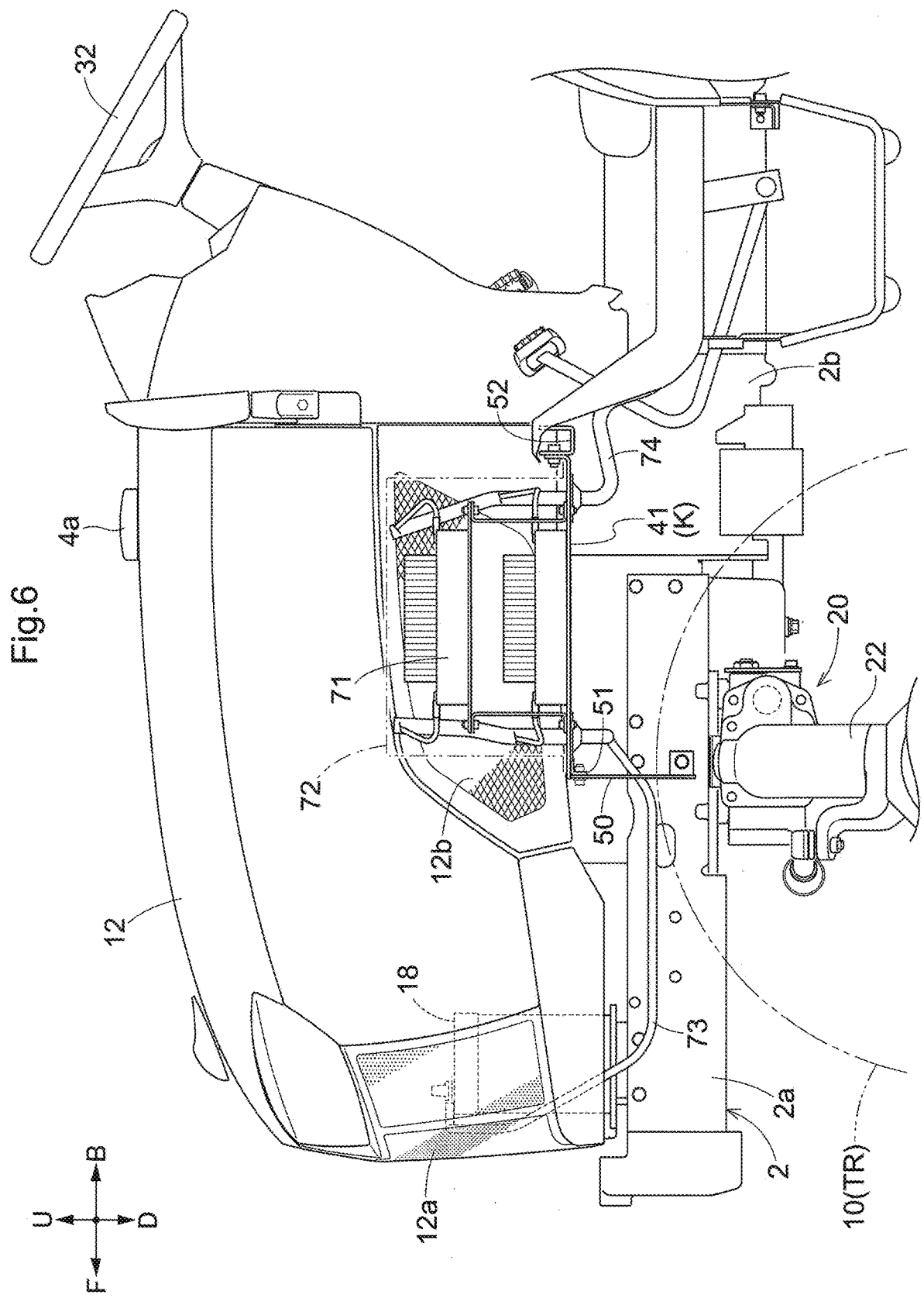

As shown in FIGS. 5 and 6, the tractor 1 includes a support stay 50, an L-shaped member 51, and a U-shaped member 52. The support stay 50 extends leftward and upward from the left side surface portion of the body frame 2.

The L-shaped member 51 is fixed to the lower surface of the front end portion of the front deck 41. Also, the lower end portion of the support stay 50 is bolted to the left main frame 2a. Also, the upper end portion of the support stay 50 is bolted to the L-shaped member 51.

The U-shaped member 52 extends leftward from the left side surface portion of the body frame 2. The U-shaped member 52 is fixed to the left portion of the power transmission device 2b. Also, the rear end portion of the front deck 41 is bent upward. The rear end portion of the front deck 41 is bolted to the front side surface of the U-shaped member 52.

With the above-described configuration, the front portion of the front deck 41 is supported by the body frame 2 via the support stay 50 and the L-shaped member 51. Also, the rear portion of the front deck 41 is supported by the body frame 2 via the U-shaped member 52.

Figure 7:
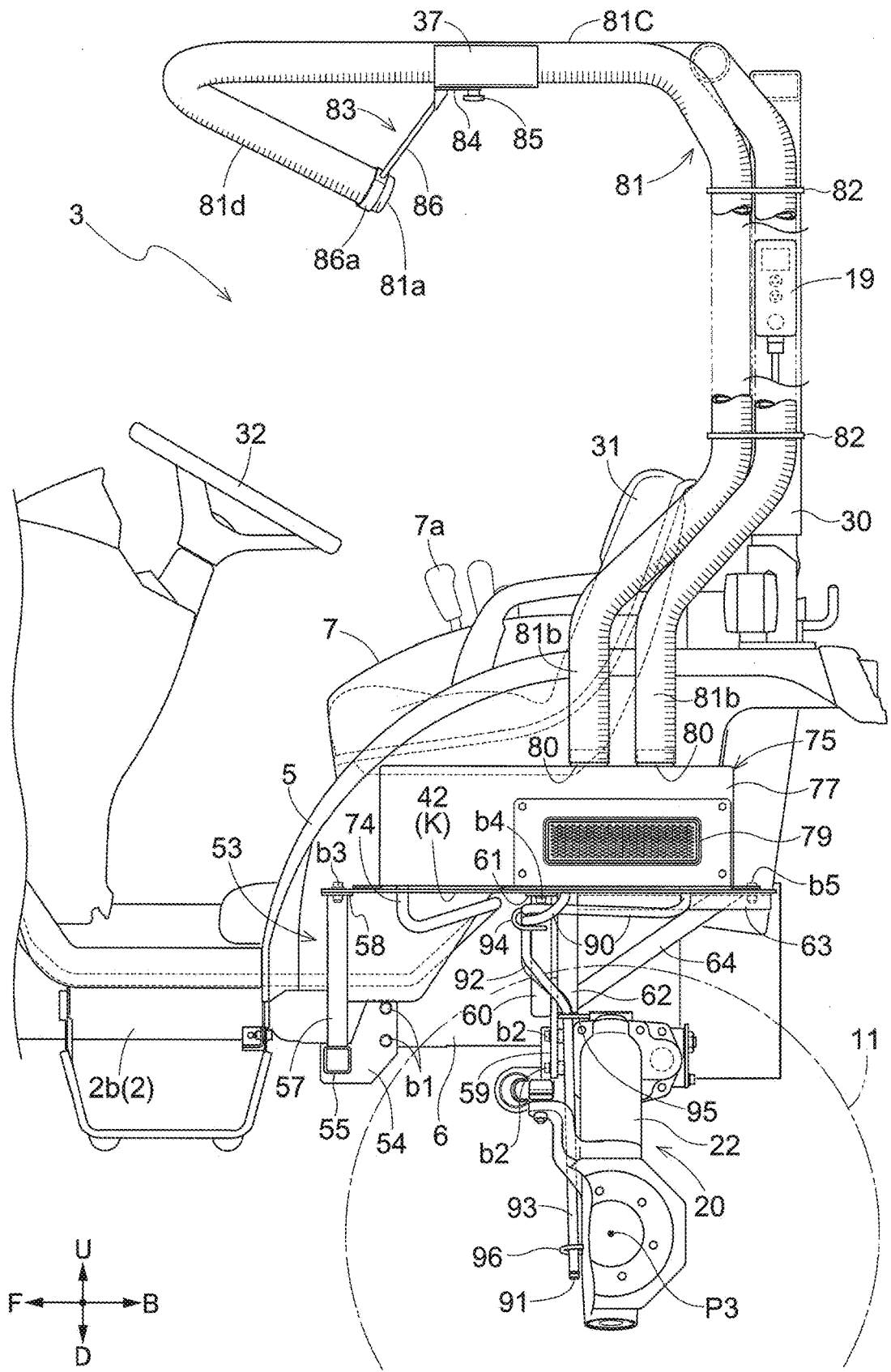

As shown in FIGS. 3, 4, and 7, the tractor 1 includes a support frame 53. The support frame 53 includes a first plate-shaped coupling portion 54, a first horizontal frame 55, a first vertical frame 56, a second vertical frame 57, and a second horizontal frame 58.

The first plate-shaped coupling portion 54 is a member in the shape of a vertically orientated plate. The first plate-shaped coupling portion 54 is fastened and fixed to the transmission 6 with a plurality of first fasteners b1. As a result, the first plate-shaped coupling portion 54 is fastened and fixed to the body frame 2 via the transmission 6.

Note that in the present preferred embodiment, the first fasteners b1 are bolts, for example.

The first horizontal frame 55 extends in the left-right direction of the body. The first horizontal frame 55 is a tubular frame having a quadrangular cross section. The right end portion of the first horizontal frame 55 is welded and fixed to the left side surface of the first plate-shaped coupling portion 54.

The first vertical frame 56 extends in the up-down direction of the body. The lower end portion of the first vertical frame 56 is welded and fixed to the central portion of the first horizontal frame 55 with respect to the left-right direction of the body.

The second vertical frame 57 extends in the up-down direction of the body. The lower end portion of the second vertical frame 57 is welded and fixed to the left end portion of the first horizontal frame 55 with respect to the left-right direction of the body.

The second horizontal frame 58 extends in the left-right direction of the body in such a manner as to connect the first vertical frame 56 and the second vertical frame 57 to each other. The second horizontal frame 58 is a member in the shape of a horizontally orientated plate. The second horizontal frame 58 is welded and fixed to the upper end portion of the first vertical frame 56 and the upper end portion of the second vertical frame 57.

The second horizontal frame 58 faces the lower surface of the front end portion of the rear deck 42. Also, the front portion of the rear deck 42 is supported by the second horizontal frame 58. That is, the front portion of the rear deck 42 is supported by the body frame 2 via the first plate-shaped coupling portion 54, the first horizontal frame 55, the first vertical frame 56, the second vertical frame 57, and the second horizontal frame 58.

As shown in FIGS. 3, 4, and 7, the support frame 53 includes a second plate-shaped coupling portion 59, a first diagonal frame 60, a third horizontal frame 61, a third vertical frame 62, a fourth horizontal frame 63, and a second diagonal frame 64.

The second plate-shaped coupling portion 59 is a vertically orientated plate. The second plate-shaped coupling portion 59 is fastened and fixed with a plurality of second fasteners b2 to the case main body 21b in the horizontal case portion 21 corresponding to the rear wheel 11 on the left side of the body. As a result, the second plate-shaped coupling portion 59 is fastened and fixed to the body frame 2 via the case main body 21b.

Note that in the present preferred embodiment, the second fasteners b2 are bolts, for example.

The first diagonal frame 60 extends leftward and upward from the second plate-shaped coupling portion 59. The lower end portion of the first diagonal frame 60 is welded and fixed to the front side surface of the second plate-shaped coupling portion 59.

The third horizontal frame 61 extends in the left-right direction of the body. The third horizontal frame 61 is a horizontally orientated plate. The third horizontal frame 61 is welded and fixed to the upper end portion of the first diagonal frame 60.

The third vertical frame 62 extends in the up-down direction of the body. The lower end portion of the third vertical frame 62 is welded and fixed to the rear side surface of the second plate-shaped coupling portion 59.

The fourth horizontal frame 63 extends in the front-rear direction of the body. The fourth horizontal frame 63 has an L-shaped cross section. The front end portion of the fourth horizontal frame 63 is welded and fixed to the rear side surface of the upper end portion of the third vertical frame 62.

The second diagonal frame 64 extends rearward and upward from the lower end portion of the third vertical frame 62. The lower end portion of the second diagonal frame 64 is welded and fixed to the rear side surface of the lower end portion of the third vertical frame 62. The upper end portion of the second diagonal frame 64 is welded and fixed to the rear portion of the fourth horizontal frame 63.

The third horizontal frame 61 faces the lower surface of the central portion of the rear deck 42 in the front-rear direction of the body. Also, the central portion of the rear deck 42 with respect to the front-rear direction of the body is supported by the third horizontal frame 61. That is, the central portion of the rear deck 42 with respect to the front-rear direction of the body is supported by the body frame 2 via the second plate-shaped coupling portion 59, the first diagonal frame 60, and the third horizontal frame 61.

The fourth horizontal frame 63 faces the lower surface of the right rear portion of the rear deck 42. Also, the right rear portion of the rear deck 42 is supported by the fourth horizontal frame 63. That is, the right rear portion of the rear deck 42 is supported by the body frame 2 via the second plate-shaped coupling portion 59, the third vertical frame 62, the fourth horizontal frame 63, and the second diagonal frame 64.

With the configuration described above, the rear deck 42 is supported by the support frame 53. Also, the support frame 53 is supported by the body frame 2. Also, the support frame 53 is fastened and fixed to the body frame 2 with the plurality of first fasteners b1 and the plurality of second fasteners b2. Also, the support frame 53 can be removed from the body frame 2 by unfastening the plurality of first fasteners b1 and the plurality of second fasteners b2.

That is, the support frame 53 is fastened and fixed to the body frame 2 with the first fasteners b1 and the second fasteners b2, and is attachable to and detachable from the body frame 2.

As shown in FIGS. 3, 4, and 7, the rear deck 42 is fastened and fixed to the support frame 53 with a third fastener b3, a fourth fastener b4, a fifth fastener b5, and a sixth fastener b6. As a result, the rear deck 42 is coupled to the support frame 53.

More specifically, the front portion of the rear deck 42 is fastened and fixed to the second horizontal frame 58 with the third fastener b3 and the sixth fastener b6. Also, the central portion of the rear deck 42 with respect to the front-rear direction of the body is fastened and fixed to the third horizontal frame 61 with the fourth fastener b4. Also, the right rear portion of the rear deck 42 is fastened and fixed to the fourth horizontal frame 63 with the fifth fastener b5.

Note that in the present preferred embodiment, the third fastener b3, the fourth fastener b4, the fifth fastener b5, and the sixth fastener b6 are all bolts, for example.

Also, unfastening the third fastener b3, the fourth fastener b4, the fifth fastener b5, and the sixth fastener b6 uncouples the rear deck 42 and the support frame 53 from each other. As a result, the rear deck 42 can be removed outward in the left-right direction of the body. In the present preferred embodiment, the rear deck 42 can be removed toward the left side of the body.

That is, the rear deck 42 can be removed outward in the left-right direction of the body by uncoupling the rear deck 42 and the support frame 53 from each other.

As shown in FIG. 3, the position of the left end of the support frame 53 (the position of the left end of the second horizontal frame 58) substantially matches the first left end position L1. Also, the position of the left end of the support frame 53 (the position of the left end of the second horizontal frame 58) is rightward of the second left end position L2.

That is, the support frame 53 is on the inner side of the rear wheel 11 on the left side of the body with respect to the left-right direction of the body.

Also, as shown in FIGS. 3, 4, and 7, the support frame 53 is below the fender 5 on the left side of the body.

As described above, the support frame 53 for supporting the rear deck 42 is (i) on the inner side of the travel device TR on one side in the left-right direction of the body with respect to the left-right direction of the body and (ii) below the fender 5 on one side in the left-right direction of the body.

Note that preferred embodiments of the present invention are not limited to the above-described configuration. The position of the left end of the support frame 53 (the position of the left end of the second horizontal frame 58) may be rightward of the first left end position L1 or leftward of the first left end position L1.

Figure 8:
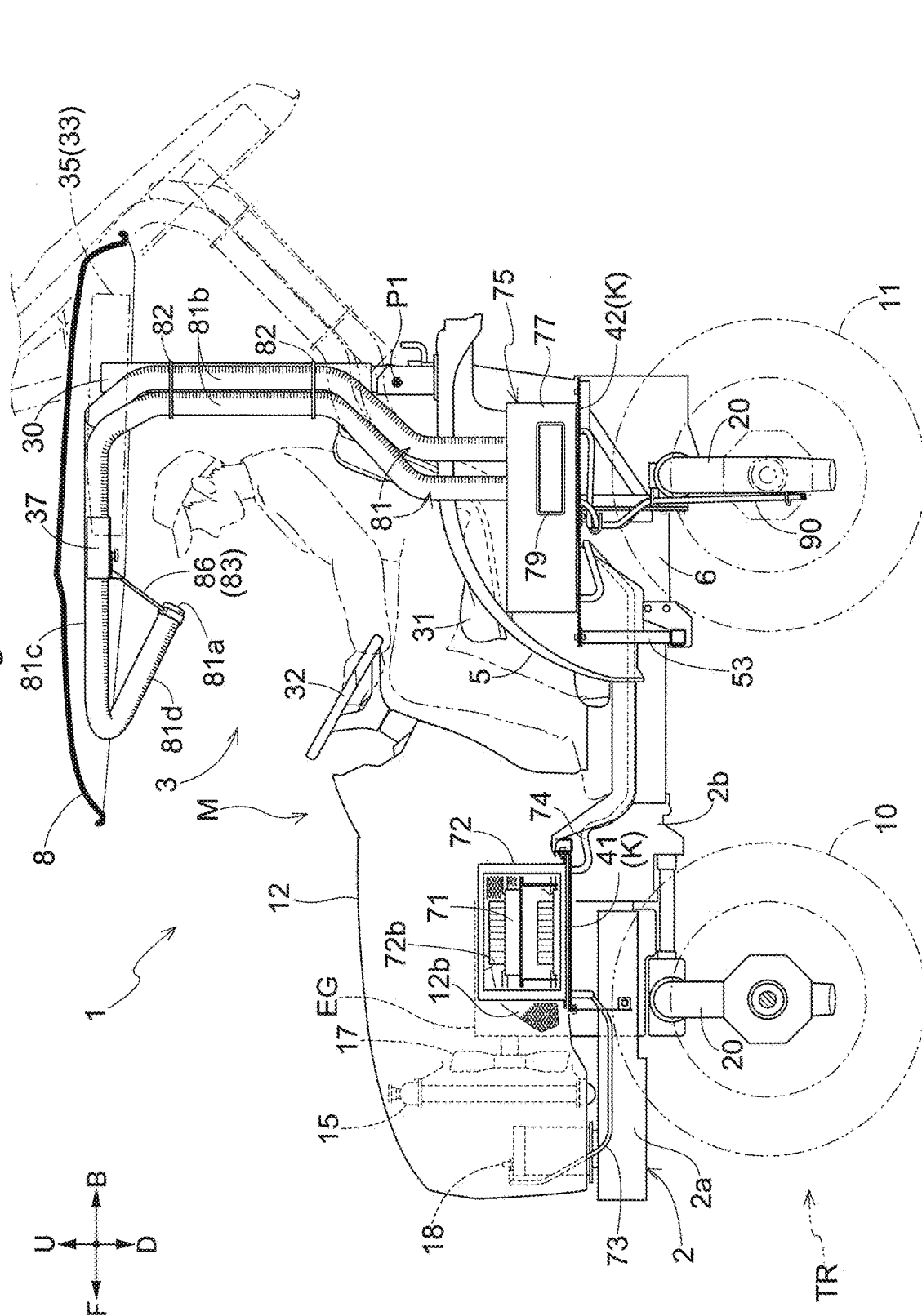
Figure 9:
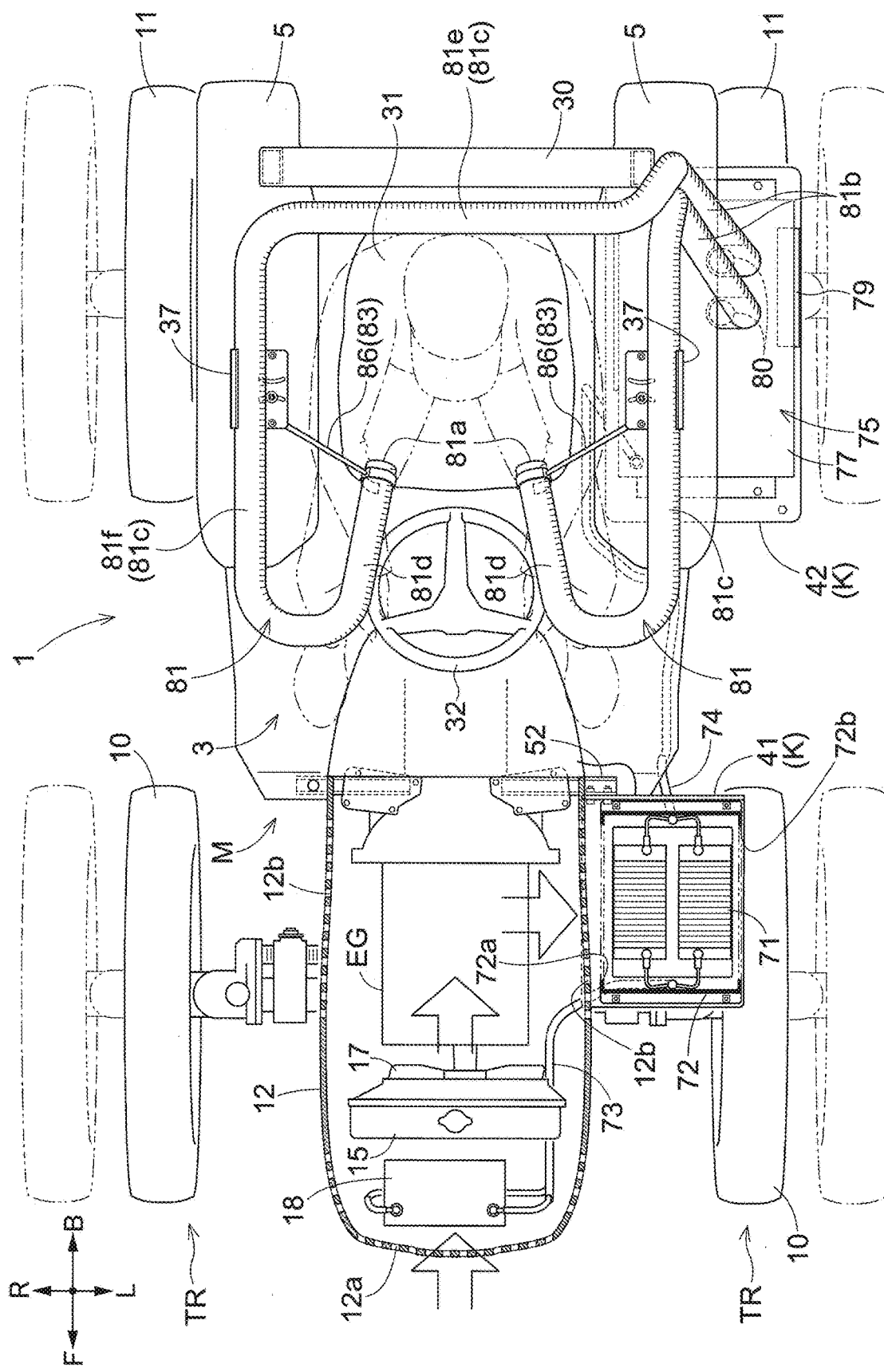

As shown in FIGS. 1 and 2, the tractor 1 includes a converter 71 and an air conditioner 75. As shown in FIGS. 8 and 9, the converter 71 is electrically connected to the battery 18 via a first harness 73. Also, the converter 71 is electrically connected to the air conditioner 75 via a second harness 74.

Electricity from the battery 18 is supplied to the converter 71 via the first harness 73. The converter 71 transforms the voltage of the electricity supplied from the battery 18 to the required voltage for the air conditioner 75. Then, the converter 71 supplies the transformed electricity to the air conditioner 75 via the second harness 74.

That is, the tractor 1 includes the battery 18 and the converter 71 that transforms the voltage of electricity supplied from the battery 18 to the required voltage for the air conditioner 75.

Note that in this preferred embodiment, the voltage of the battery 18 is lower than the required voltage for the air conditioner 75. The converter 71 steps up the voltage of electricity supplied from the battery 18.

However, preferred embodiments of the present invention are not limited to this. The voltage of the battery 18 may be higher than the required voltage for the air conditioner 75. Also, the converter 71 may be configured to step down the voltage of the electricity supplied from the battery 18.

The air conditioner 75 operates on the electricity supplied from the converter 71. The air conditioner 75 takes in air and adjusts the taken-in air. Then, the air conditioner 75 sends conditioned air to the driver section 3 through ducts 81.

As described above, the tractor 1 includes the air conditioner 75 for the driver section 3. Also, the tractor 1 includes the ducts 81 to supply the conditioned air from the air conditioner 75. In other words, the tractor 1 includes the ducts 81 that guide the air from the air conditioner 75 to the driver section 3. Also, the tractor 1 includes the air conditioner 75 that operates as it receives electricity from the converter 71.

The configuration of the converter 71 will be described below. Note that in FIGS. 9 and 10, the left and right travel devices TR in the state where the tread is the narrowest are indicated by solid lines. Also, the left and right travel devices TR in the state in which the tread is the widest are indicated by virtual lines.

As shown in FIGS. 1 and 2, the converter 71 is leftward of the body of the tractor 1. That is, the converter 71 is lateral to the body on one side in the left-right direction of the body. As a result, the converter 71 is leftward of a central position CE (see FIG. 2) of the body relative to the body.

That is, the converter 71 is on one side of the central position CE of the body with respect to the left-right direction of the body.

In the present preferred embodiment, the converter 71 includes an outer case 72. However, preferred embodiments of the present invention are not limited to this, and the converter 71 need not include the outer case 72.

The converter 71 is mounted on the upper surface of the front deck 41 and supported by the front deck 41. As described above, the front deck 41 is supported by the body frame 2. That is, the converter 71 is supported by the body.

In this manner, the converter 71 is supported by the body and lateral to the body.

As shown in FIGS. 1, 2, 8, and 9, the converter 71 is above the front wheel 10 on the left side of the body and overlaps with the front wheel 10 on the left side of the body in a plan view when the tread of the left and right travel devices TR is the narrowest.

That is, the converter 71 is above the travel device TR on one side in the left-right direction of the body and overlaps with the travel device TR on one side of the left and right travel devices TR with respect to the left-right direction of the body in a plan view. Also, the converter 71 is above the front wheel 10 on one side in the left-right direction of the body and overlaps with that one of the left and right front wheels 10 which is on one side in the left-right direction of the body in a plan view.

Also, as shown in FIG. 2, the converter 71 is rightward of the first left end position L1. That is, the converter 71 is toward the center of the body relative to the lateral outer end portion of the travel device TR with respect to the left-right direction of the body.

As shown in FIGS. 1, 2, 8, and 9, the converter 71 is lateral to the engine hood 12. More specifically, the converter 71 is lateral to a portion of the engine hood 12 which portion is rearward of the battery 18 in the front-rear direction of the body.

Also, the converter 71 is leftward of the exhaust grille portion 12b on the left side of the body. That is, the converter 71 is lateral to the exhaust grille portion 12b.

As shown in FIG. 9, the outer case 72 includes a first opening 72a and a second opening 72b. The first opening 72a is in a portion of the outer case 72 which portion is opposite to the exhaust grille portion 12b.

The second opening 72b is in a portion of the outer case which portion is opposite to the first opening 72a in the direction of approaching and moving away from the body. More specifically, the second opening 72b is in a portion of the outer case 72 which portion is opposite to the first opening 72a in the left-right direction of the body.

That is, the second opening 72b is in a portion of the outer case 72 which portion is opposite to the first opening 72a in the direction of approaching and moving away from the body.

According to the configuration described above, the first opening 72a is in the right side wall of the outer case 72, and the second opening 72b is in the left side wall of the outer case 72.

In FIG. 9, the flow of the cooling air passing through the engine hood 12 is indicated by an arrow. As shown in FIG. 9, the air introduced into the engine hood 12 via the introduction section 12a cools the engine EG as cooling air. Thereafter, at least some of the cooling air is discharged from the exhaust grille portion 12b on the left side of the body.

The cooling air discharged from the exhaust grille portion 12b on the left side of the body is introduced into the outer case 72 via the first opening 72a. The converter 71 is cooled by this cooling air. Thereafter, the cooling air is discharged from the second opening 72b.

That is, that portion of the exterior case 72 which faces the exhaust grille portion 12b includes a first opening 72a capable of receiving cooling air.

The configuration of the air conditioner 75 will be described below.

As shown in FIGS. 1 and 2, the air conditioner 75 is on the left side of the body. That is, the air conditioner 75 is lateral to the body on one side in the left-right direction of the body. As a result, the air conditioner 75 is leftward of the central position CE (see FIG. 2) of the body.

Also, the air conditioner 75 is rearward of the converter 71 with respect to the front-rear direction of the body. More specifically, the air conditioner 75 is behind the converter 71.

That is, the air conditioner 75 is rearward of the converter 71 with respect to the front-rear direction of the body and on one side of the central position CE of the body with respect to the left-right direction of the body.

The air conditioner 75 is mounted on the upper surface of the rear deck 42 and supported by the rear deck 42. That is, the air conditioner 75 is mounted on and supported by the rear deck 42. Also, as described above, the rear deck 42 is supported by the body frame 2. That is, the air conditioner 75 is supported by the body.

In this manner, the air conditioner 75 is supported by the body and lateral to the body.

Figure 10:
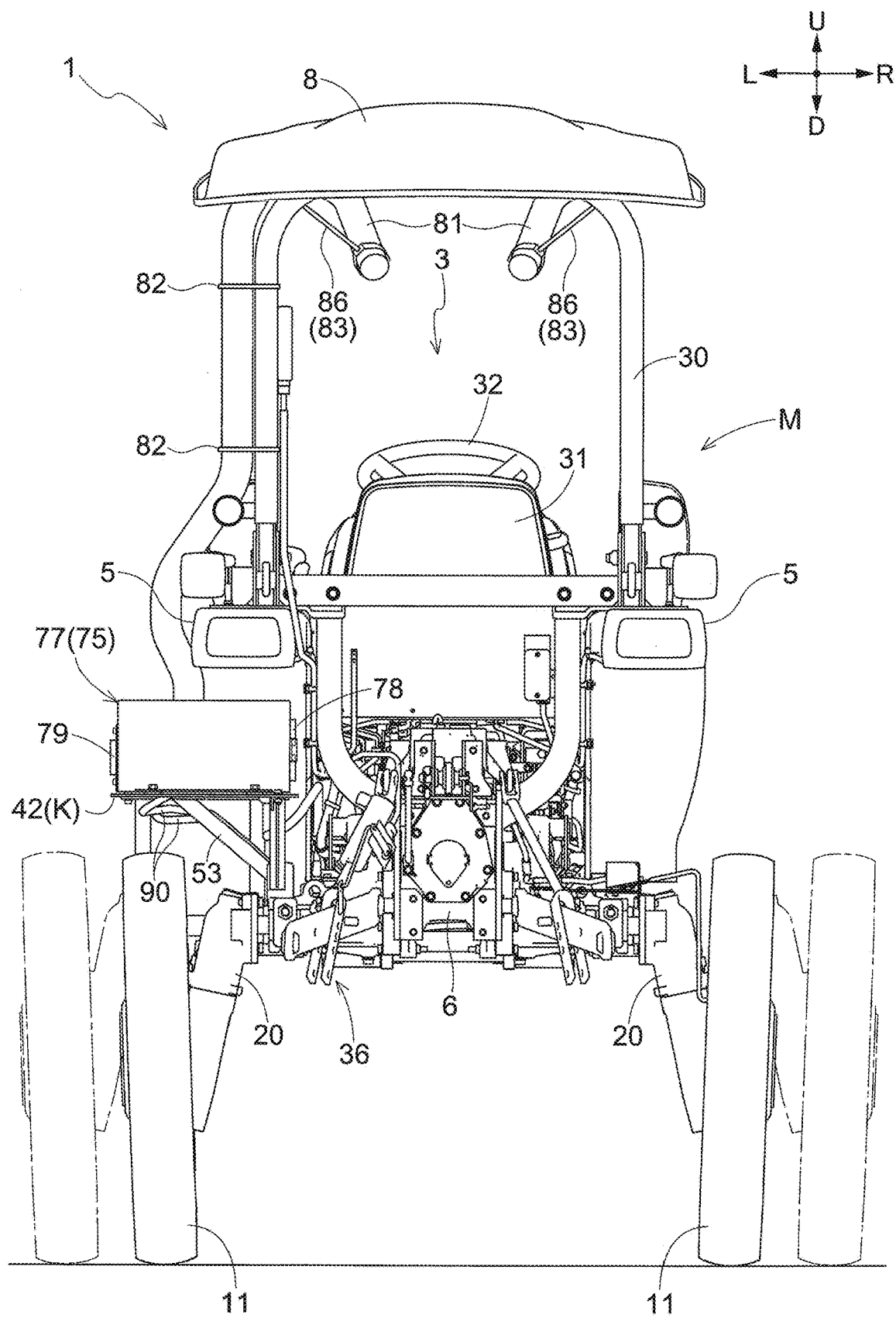
FIG. 10 is a rear view of the tractor.

As shown in FIGS. 1 and 10, the air conditioner 75 is at a position lower than the upper end portion of the driver seat 31. In other words, the air conditioner 75 is below the upper end of the driver seat 31.

Note that in the present preferred embodiment, the upper end position of the air conditioner 75 substantially matches the lower end position of the driver seat 31. However, preferred embodiments of the present invention are not limited to this, and the upper end position of the air conditioner 75 may be lower than the lower end position of the driver seat 31. That is, the air conditioner 75 may be below the lower end of the driver seat 31. Also, the upper end position of the air conditioner 75 may be above the lower end position of the driver seat 31. Also, the upper end position of the air conditioner 75 may be lower than the upper end position of the seat surface of the driver seat 31. The upper end position of the air conditioner 75 being lower leads to the position of the center of gravity of the tractor 1 being lower, which is preferable.

As shown in FIGS. 1, 2, 8, and 9, the air conditioner 75 is above the rear wheel 11 on the left side of the body and overlaps with the rear wheel 11 on the left side of the body in a plan view when the tread of the left and right travel devices TR is the narrowest.

That is, the air conditioner 75 is above the travel device TR on one side in the left-right direction of the body and overlaps with that one of the left and right travel devices TR which is on one side in the left-right direction of the body in a plan view. Also, the air conditioner 75 is above the rear wheel 11 on one side in the left-right direction of the body and overlaps with that one of the left and right rear wheels 11 which is on one side in the left-right direction of the body in a plan view.

Also, as shown in FIG. 2, the air conditioner 75 includes a case portion 77 and an exhaust port 79. The case portion 77 has a box-like outer shape. Also, the left end position of the air conditioner 75 (the left end position of the exhaust port 79) substantially matches the fourth left end position L4.

That is, the lateral outer end of the air conditioner 75 is outward of the body in the left-right direction of the body relative to the lateral outer end portion of the left travel device TR in the state where the tread is the narrowest. Also, the lateral outer end of the air conditioner 75 is toward the center of the body in the left-right direction of the body relative to the lateral outer end portion of the left travel device TR in the state where the tread is the widest.

As described above, in the state where the tread of the left and right travel devices TR is the widest, the air conditioner 75 is toward the center of the body in the left-right direction of the body relative to the lateral outer end portion of the travel device TR on one side in the left-right direction of the body.

Note that preferred embodiments of the present invention are not limited to the above-described configuration. The air conditioner 75 may be toward the center of the body in the left-right direction of the body relative to the lateral outer end portion of the travel device TR on one side in the left-right direction of the body in the state where the tread of the left and right travel devices TR is the narrowest.

As shown in FIG. 2, the air conditioner 75 is below the fender 5 on the left side of the body and overlaps with the fender 5 on the left side of the body in a plan view.

That is, the air conditioner 75 is below the fender 5 on one side in the left-right direction of the body and overlaps with the fender 5 on one side in the left-right direction of the body in a plan view.

Also, as shown in FIGS. 1 and 2, the air conditioner 75 extends between a location above the rear wheel 11 on the left side of the body and a location below the fender 5 on the left side of the body.

That is, the air conditioner 75 extends between a location above the travel device TR on one side in the left-right direction of the body and a location below the fender 5 on one side in the left-right direction of the body.

Also, as shown in FIGS. 2, 4, and 10, the air conditioner 75 protrudes from the fender 5 on the left side of the body to the left side of the body.

That is, the air conditioner 75 protrudes from the fender 5 on one side in the left-right direction of the body outward in the left-right direction of the body.

Figure 11:
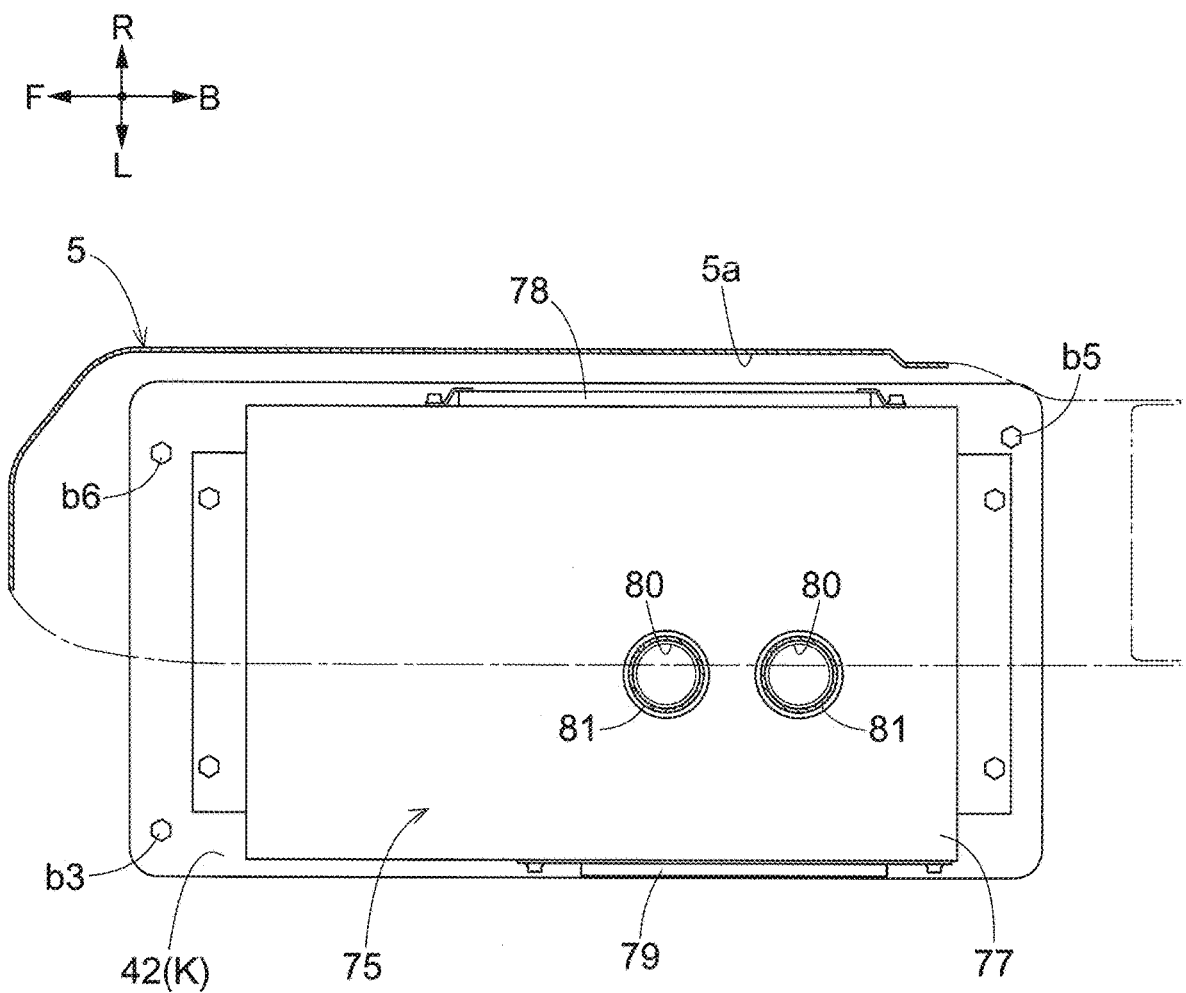

Also, as shown in FIGS. 4 and 11, the air conditioner 75 includes connection portions 80. Note that in this preferred embodiment, two connection portions 80 are provided. However, preferred embodiments of the present invention are not limited to this, and the number of connection portions 80 may be one or three or more.

Each connection portion 80 is on the upper surface portion of that portion of the air conditioner 75 which protrudes from the fender 5 on the left side of the body. Also, a duct 81 is connected to each connection portion 80.

It should be noted that "each connection portion 80 is on the upper surface portion of that portion of the air conditioner 75 which protrudes from the fender 5 on the left side of the body" means that at least a portion of each connection portion 80 is on the upper surface portion of that portion of the air conditioner 75 which protrudes from the fender 5 on the left side of the body.

For example, as shown in FIG. 11, in the present preferred embodiment, the right side portions of the connection portions 80 are on the upper surface portion of that portion of the air conditioner 75 which is covered by the fender 5 on the left side of the body. Also, the remaining portions of the connection portions 80 are on the upper surface portion of that portion of the air conditioner 75 which protrudes from the fender 5 on the left side of the body. In the present specification, if at least a portion of the connection portion 80 is on the upper surface portion of that portion of the air conditioner 75 which protrudes from the fender 5 on the left side of the body in this manner, it is assumed that the connection portion 80 is "on the upper surface portion of that portion of the air conditioner 75 which protrudes from the fender 5 on the left side of the body."

In other words, in the present preferred embodiment, the connection portions 80 to which the ducts 81 are connected are on the upper surface portion of that portion of the air conditioner 75 which protrudes from the fender 5 on one side in the left-right direction of the body.

As shown in FIGS. 4 and 11, the air conditioner 75 includes a heat exchanger 76 and an intake port 78. The heat exchanger 76 is accommodated in the case portion 77.

That is, the air conditioner 75 includes the heat exchanger 76 and the case portion 77 to accommodate the heat exchanger 76.

As shown in FIG. 11, the intake port 78 is in a portion of the case portion 77 which portion faces the center of the body in a plan view. More specifically, the intake port 78 is in the right side wall of the case portion 77.

Also, the exhaust port 79 is in a portion of the case portion 77 which portion is opposite to the intake port 78 in a plan view. More specifically, the exhaust port 79 is on the left side wall of the case portion 77.

The intake port 78 is configured such that outside air can be introduced into the case portion 77. Also, as shown in FIG. 4, the exhaust port 79 is connected to the heat exchanger 76.

When the air conditioner 75 is operating, the heat exchanger 76 takes in air through the intake port 78. Then, the heat exchanger 76 adjusts the taken-in air by performing heat exchange. The heat exchanger 76 sends the conditioned air to the ducts 81 via the connection portions 80. Also, the heat exchanger 76 discharges the exhaust generated through the heat exchange via the exhaust port 79.

As described above, the intake port 78 corresponds to the heat exchanger 76. That is, the intake port 78 for the heat exchanger 76 is in a portion of the case portion 77 which portion faces the center of the body in a plan view.

As shown in FIGS. 4 and 11, the fender 5 on the left side of the body includes a wall portion 5a. The wall portion 5a faces the intake port 78. Also, the wall portion 5a is separate from the intake port 78.

As shown in FIG. 4, the wall portion 5a extends over the up-down dimension of the intake port 78. Also, as shown in FIG. 11, the wall portion 5a extends over the width of the intake port 78. Note that in the present preferred embodiment, the width of the intake port 78 corresponds to the dimension of the intake port 78 in the front-rear direction of the body.

That is, at a position facing the intake port 78, the wall portion 5a extends over the up-down dimension of the intake port 78 and the width of the intake port 78 and is separated from the intake port 78.

As shown in FIG. 7, the tractor 1 as the present preferred embodiment includes an operation device 19. The operation device 19 is supported by the protective frame 30. The driver in the driver seat 31 can operate the operation device 19. The operation device 19 may be configured to wirelessly communicate with the heat exchanger 76, or perform wired communication with the heat exchanger 76.

Operating the operation device 19 changes how the heat exchanger 76 operates. For example, operating the operation device 19 may start or stop the operation of the heat exchanger 76 or set the target temperature for the conditioned air to be sent from the heat exchanger 76 to the driver section 3.

The configuration of the duct 81 will be described below.

As shown in FIGS. 7 to 9, the tractor 1 in the present preferred embodiment includes two ducts 81, for example. However, preferred embodiments of the present invention are not limited to this, and the number of ducts 81 may be one or three or more.

Each duct 81 includes an outlet 81a, a vertical portion 81b, a horizontal portion 81c, and a rearwardly downward portion 81d. The vertical portion 81b extends in the up-down direction of the body. The lower end portion of the vertical portion 81b is connected to the connection portion 80. Also, the vertical portion 81b extends upward from the air conditioner 75. Also, the upper portion of the vertical portion 81b extends upward at a position rearward of the driver seat 31.

The upper portion of the vertical portion 81b is fastened to the protective frame 30 with a plurality of duct holding members 82. Each duct holding member 82 is in an annular shape. Each duct holding member 82 bundles the two ducts 81 together with the protective frame 30.

The horizontal portion 81c extends in the horizontal direction from the upper end portion of the vertical portion 81b. The horizontal portion 81c extends from the upper end portion of the vertical portion 81b to a position forward of the driver in the driver seat 31 in a side view. Also, as shown in FIG. 8, the horizontal portion 81c extends over the driver's head in a side view.

That is, the duct 81 includes (i) the vertical portion 81b extending upward from the air conditioner 75 at a position rearward of the driver seat 31 and (ii) the horizontal portion 81c extending from the upper end portion of the vertical portion 81b to a position forward of the driver seated in the driver seat 31 in a plan view.

Note that as shown in FIG. 9, in the present preferred embodiment, the horizontal portion 81c in one of the two ducts 81 extends through the left side of the driver in a plan view. Also, the horizontal portion 81c of the other of the two ducts 81 extends through the right side of the driver in a plan view.

In the following description, the horizontal portion 81c passing through the left side of the driver in a plan view is referred to as a left horizontal portion 81c. Also, the horizontal portion 81c passing through the right side of the driver in a plan view is referred to as a right horizontal portion 81c.

The left horizontal portion 81c extends forward from the upper end portion of the vertical portion 81b. Also, the right horizontal portion 81c includes a first portion 81e extending rightward from the upper end portion of the vertical portion 81b, and a second portion 81f extending forward from the right end portion of the first portion 81e.

As shown in FIGS. 8 and 9, the rearwardly downward portion 81d extends rearward and downward from the front end portion of the horizontal portion 81c. Also, an outlet 81a is at the leading end portion of the rearwardly downward portion 81d.

Also, the rearwardly downward portion 81d is at the front end portion of the duct 81. That is, the outlet 81a is at the front end portion of the duct 81.

The rearwardly downward portion 81d is forward of the driver seated in the driver seat 31. The outlet 81a faces the driver in the driver seat 31. Also, the conditioned air sent from the air conditioner 75 to the duct 81 extends through the vertical portion 81b, the horizontal portion 81c, and the rearwardly downward portion 81d, and is blown out from the outlet 81a toward the driver.

That is, that part of the duct 81 which is located forward of the driver has an outlet 81a to blow conditioned air toward the driver.

In this preferred embodiment, each duct 81 is in the form of a flexible member. Although not particularly limited, the duct may be in the form of a bellows-shaped cylinder made of polyethylene.

Here, the vertical portion 81b, which is part of the duct 81, is also in the form of a flexible member. Also, as described above, the upper portion of the vertical portion 81b is fastened to the protective frame 30 with the plurality of duct holding members 82. As a result, the vertical portion 81b is supported by the protective frame 30 and extends along the protective frame 30.

That is, the vertical portion 81b is in the form of a flexible member, supported by the protective frame 30, and attached to the protective frame 30.

As shown in FIG. 8, the protective frame 30 is swingable about a frame swing axis P1 extending in the left-right direction of the body. As a result, the orientation of the protective frame 30 is changeable to a use orientation and an inclined orientation. The use orientation is a standing orientation. The inclined orientation is an orientation inclined rearward from the use orientation.

That is, the protective frame 30 is configured such that the orientation is changeable between a standing use orientation and an inclined orientation inclined rearward from the use orientation.

The protective frame 30 and the roof portion 8 swing integrally about the frame swing axis P1. For this reason, as the orientation of the protective frame 30 is changed, the orientation of the roof portion 8 also changes. Note that in FIG. 8, the protective frame 30 in the use orientation is indicated by a solid line. Also, the protection frame 30 in the inclined orientation is indicated by a virtual line.

Also, the vertical portion 81b deforms according to the change in the orientation of the protective frame 30.

Figure 12:
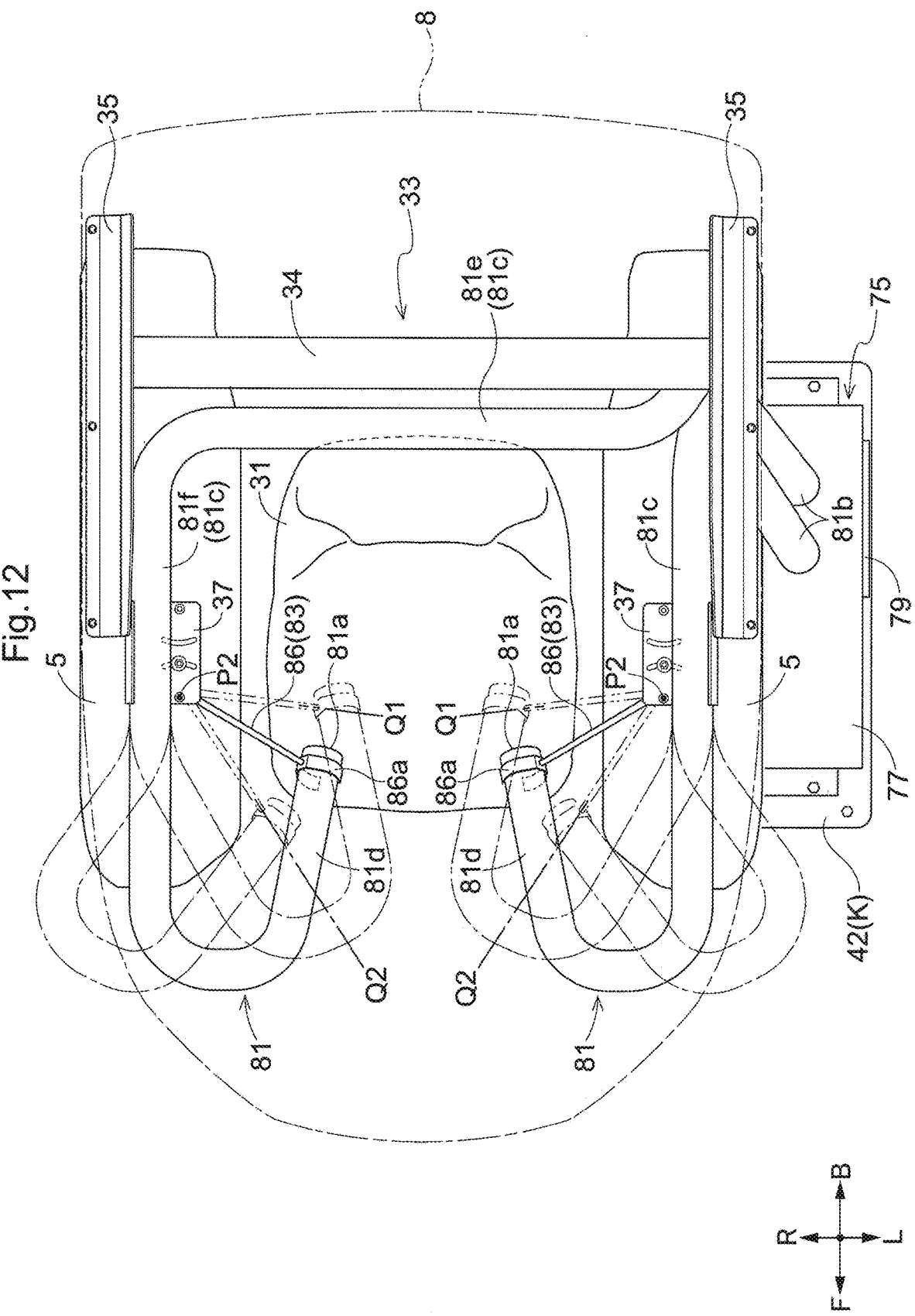

As shown in FIGS. 8 and 12, the tractor 1 includes a roof frame 33. The roof frame 33 includes a first frame 34 and left and right second frames 35. The first frame 34 extends in the left-right direction of the body. The first frame 34 is supported on the upper surface of the protective frame 30. That is, the first frame 34 is supported at the upper portion of the protective frame 30.

The left and right second frames 35 each extend in the front-rear direction of the body. The left second frame 35 is supported at the left end portion of the first frame 34. The right second frame 35 is supported at the right end portion of the first frame 34.

That is, the roof frame 33 is supported at the upper portion of the protective frame 30.

Also, the roof portion 8 is supported by the left and right second frames 35. That is, the tractor 1 includes a roof frame 33 supporting the roof portion 8.

As shown in FIGS. 8, 9, and 12, the tractor 1 includes left and right duct receiving portions 37. The left duct receiving portion 37 is welded and fixed to the front end portion of the left second frame 35. The left duct receiving portion 37 supports the left horizontal portion 81c from below. Also, the right duct receiving portion 37 is welded and fixed to the front end portion of the right second frame 35. The right duct receiving portion 37 supports the right horizontal portion 81c from below.

As shown in FIG. 12, the tractor 1 includes left and right duct supports 83. The left duct support 83 is coupled to the left duct receiving portion 37. As a result, the left duct support 83 is supported by the roof frame 33 via the left duct receiving portion 37.

Also, the right duct support 83 is coupled to the right duct receiving portion 37. As a result, the right duct support 83 is supported by the roof frame 33 via the right duct receiving portion 37. That is, the duct support 83 is supported by the roof frame 33.

Figure 13:
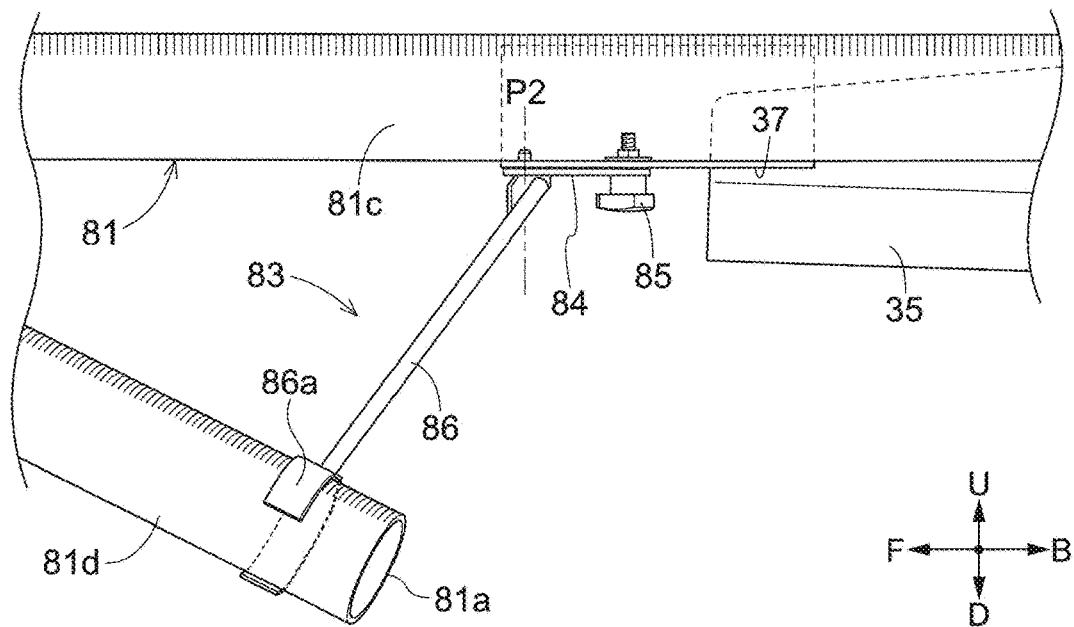
Figure 14:
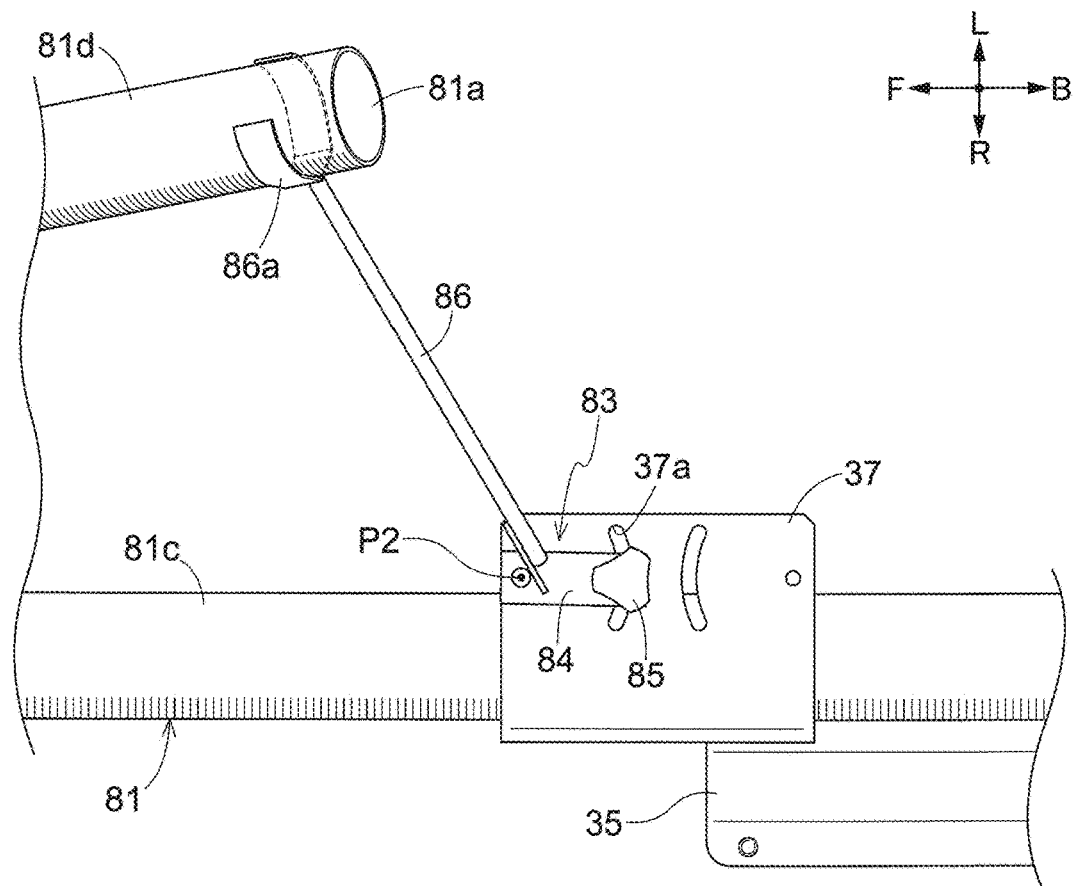

FIGS. 13 and 14 show the right duct support 83. The right duct support 83 will be described below. Note that the left and right duct supports 83 are laterally symmetrical to each other. For this reason, the following description also similarly applies to the left duct support 83.

As shown in FIGS. 13 and 14, the right duct support 83 includes a base portion 84, a knob bolt 85, and an arm portion 86 (corresponding to the "support"). The base portion 84 is a horizontally orientated plate. The base portion 84 is attached to the lower surface of the duct receiving portion 37 from below. Also, the base portion 84 is supported by the duct receiving portion 37 so as to be swingable about the arm swing axis P2 extending along the up-down direction of the body.

As shown in FIG. 14, an elongated hole 37a is in the duct receiving portion 37. The elongated hole 37a is in a circular arc shape centered about the arm swing axis P2. The knob bolt 85 extends through the rear end portion of the base portion 84 in the up-down direction. Also, the knob bolt 85 is inserted in the elongated hole 37a. Note that the arm swing shaft core P2 extends through the front end portion of the base portion 84.

As shown in FIGS. 13 and 14, the arm portion 86 is an elongated member extending downward from the base portion 84. The upper end portion of the arm portion 86 is welded and fixed to the base portion 84. Also, the arm portion 86 includes a holding portion 86a. The holding portion 86a is at the lower end portion of the arm portion 86.

The holding portion 86a is in the shape of a circular arc that extends along the outer shape of the rearwardly downward portion 81d in its peripheral direction. The holding portion 86a holds the leading end portion of the rearwardly downward portion 81d. With this configuration, the arm portion 86 supports the duct 81 in the driver section 3.

When the knob bolt 85 is tightened, the knob bolt 85 is fixed to the duct receiving portion 37. As a result, the swing position of the arm portion 86 is fixed.

When the knob bolt 85 is loosened, the knob bolt 85 is movable along the elongated hole 37a with the knob bolt 85 inserted in the elongated hole 37a. For this reason, when the knob bolt 85 is loosened, the base portion 84, the knob bolt 85, and the arm portion 86 are swingable integrally about the arm swing axis P2.

That is, when the knob bolt 85 is loosened, the swing position of the arm portion 86 is changeable.

Note that preferred embodiments of the present invention are not limited to this. The shape of the arm portion 86 may be changeable. For example, the arm portion 86 may be expandable and contractible in the longitudinal direction. In this case, the shape of the arm portion 86 changes in response to the expansion and contraction of the arm portion 86.

As described above, the tractor 1 includes an arm portion 86 that supports the duct 81 to the driver section 3 and can change at least one of its position and its shape. Also, according to the configuration described above, the arm portion 86 is supported by the roof frame 33.

As shown in FIG. 12, in the present preferred embodiment, the swing position of the arm portion 86 is changeable between a first swing position Q1 and a second swing position Q2.

The first swing position Q1 corresponds to the swing position of the arm portion 86 as displaced the most rearward. The second swing position Q2 corresponds to the swing position of the arm portion 86 as displaced the most forward.

When the arm portion 86 is at the second swing position Q2, the arm portion 86 extends along the front-rear direction and on the side over the head of the driver in the driver seat 31.

That is, the arm portion 86 is changeable so as to extend along the front-rear direction on the side over the driver's head.

As shown in FIG. 12, when the arm portion 86 swings about the arm swing axis P2, the rearwardly downward portion 81d also swings about the arm swing axis P2 together with the arm portion 86. As a result, the position and orientation of the outlet 81a will change. That is, the position and orientation of the air outlet 81a change in response to the change in the swing position of the arm portion 86.

For example, if the right arm portion 86 swings from the first swing position Q1 to the second swing position Q2, the outlet 81a corresponding to the right arm portion 86 is moved to the front right. Also, the orientation of the outlet 81a changes from a right rear orientation to a left rear orientation.

Note that preferred embodiments of the present invention are not limited to this. It is also possible for only one of the position and the orientation of the outlet 81a to change in response to the change in the swing position of the arm portion 86.

That is, the tractor 1 is configured such that at least one of the position and the orientation of the outlet 81a changes in response to the change of the arm portion 86.

As shown in FIGS. 1 and 3, the tractor 1 includes two drain pipes 90. Note that preferred embodiments of the present invention are not limited to this, and the number of drain pipes 90 may be one or three or more.

The configuration of the drain pipe 90 will be described below.

As shown in FIGS. 3 and 4, the drain pipes 90 are connected to the lower portion of the air conditioner 75. The drain pipes 90 discharge waste water generated due to the heat exchange in the heat exchanger 76.

That is, the tractor 1 includes the drain pipes 90 connected to the air conditioner 75.

Here, as described above, the air conditioner 75 is supported by the rear deck 42. Also, the rear deck 42 does not follow the travel device TR when the tread of the left and right travel devices TR is changed. That is, the rear deck 42 is on the side of the body frame 2 with respect to the tread changing device 23.

That is, the air conditioner 75 is supported by the rear deck 42 on the side of the body frame 2 with respect to the tread changing device 23. Also, a rear deck 42 that does not follow the travel device TR when the tread is changed is disposed above the travel device TR.

Also, the vertical case portion 22 follows the travel device TR when the tread of the left and right travel devices TR is changed. That is, the vertical case portion 22 is on the side of the travel device TR with respect to the tread changing device 23.

As shown in FIGS. 3 and 7, each drain pipe 90 hangs downward from the lower portion of the air conditioner 75 through a hole (not shown) in the rear deck 42. As a result, each drain pipe 90 hangs downward from the hole in the deck 42.

Each drain pipe 90 includes a drain port 91, an intermediate portion 92, and a drain port side portion 93. The drain port 91 is at the lower end portion of the drain pipe 90. The waste water that has passed through the drain pipe 90 is discharged from the drain port 91.

The drain port side portion 93 is at the lower portion of the drain pipe 90. The drain port 91 is at the lower end portion of the drain port side portion 93. The intermediate portion 92 is above (upstream of) the drain port side portion 93. Also, the drain port side portion 93 extends vertically along the vertical case portion 22 corresponding to the rear wheel 11 on the left side of the body.

That is, the drain port side portion 93 extends vertically along the vertical case portion 22.

As shown in FIGS. 3 and 7, the tractor 1 includes a first holding member 94, a second holding member 95, and a third holding member 96. The first holding member 94, the second holding member 95, and the third holding member 96 all have a U-shape.

The first holding member 94 is welded and fixed to the first diagonal frame 60. The intermediate portion 92 is supported by the first holding member 94. As a result, the intermediate portion 92 is supported by the rear deck 42 via the first holding member 94 and the first diagonal frame 60.

That is, the intermediate portion 92 of the drain pipe 90 is supported by the rear deck 42.

The second holding member 95 is welded and fixed to the upper end portion of the vertical case portion 22 corresponding to the rear wheel 11 on the left side of the body. Also, the third holding member 96 is welded and fixed to the lower portion of the vertical case portion 22 corresponding to the rear wheel 11 on the left side of the body. The drain port side portion 93 is supported by the second holding member 95 and the third holding member 96.

As a result, the drain port side portion 93 is supported by the vertical case portion 22 via the second holding member 95 and the third holding member 96. For this reason, the drain port side portion 93 follows the travel device TR when the tread of the left and right travel devices TR is changed.

That is, the drain port side portion 93 of the drain pipe 90, which includes the drain port 91, is supported by the vertical case portion 22 on the side of the travel device TR with respect to the tread changing device 23, and follows the travel device TR when the tread is changed. Also, the drain pipe 90 hangs downward from the rear deck 42, and the drain port side portion 93 is supported by the vertical case portion 22.

As shown in FIG. 3, the drainage port side portion 93 is disposed such that the drainage port 91 is on the right side relative to the rear wheel 11 on the left side of the body. As a result, the drain port 91 is within the width of the tread. With this configuration, the wastewater from the drain port 91 is drained within the width of the tread.

In this manner, the drain port side portion 93 is supported by the vertical case portion 22 such that the wastewater from the drain port 91 is drained within the width of the tread.

Also, FIGS. 3 and 7 show a rotational axis P3 of the rear wheel 11. The lower end of the drain port side portion 93 is below the rotational axis P3 of the rear wheel 11.

That is, the drain port side portion 93 extends in the up-down direction to a height corresponding to the rotational axis P3 of the rear wheel 11.

According to the configuration described above, conditioned air can be supplied to the vicinity of the driver from the outlet 81*a* of the duct 81.

Also, in the configuration described above, the air conditioner 75 is below the upper end of the driver seat 31. For this reason, the air conditioner 75 is lower than in the case where the air conditioner 75 is above the upper end of the driver seat 31. As a result, the center of gravity of the tractor 1 becomes relatively low. As a result, the orientation of the body is stable.

Moreover, in the configuration described above, the vertical portion 81*b* extends upward at a position rearward of the driver seat 31. For this reason, a situation is less likely to occur in which the field of view in front of the driver is narrow due to the vertical portion 81*b*, as compared to the case where the vertical portion 81*b* extends upward at the position on the front side relative to the driver seat 31.

That is, the configuration described above allows production of a tractor 1 which is capable of supplying conditioned air to the vicinity of the driver and in which the orientation of the body is stable and the field of view in front of the driver is not likely narrow.

Alternative Preferred Embodiments

The arrangement of one or more, or all of the members may be reversed in the left-right direction.

The front portion of the duct 81 may be retractable to a position rearward of the front end portion of the driver seat 31 by changing the swing position of the arm portion 86. For example, the first swing position Q1 may be the same as that of the above-described preferred embodiment, and the arm portion 86 may be swingable by 180 degrees from the first swing position Q1 outward of the body. In this case, when the arm portion 86 is swung by 180 degrees from the first swing position Q1 outward of the body, the front portion of the duct 81 is retracted to a position rearward of the front end portion of the driver seat 31.

That is, the tractor 1 may be configured such that the front portion of the duct 81 is retractable to a position rearward of the front end portion of the driver seat 31 by changing the arm portion 86.

The air conditioner 75 may also be on the front side or the rear side of the body.

The air conditioner 75 may also protrude outward from the body in the left-right direction of the body relative to the lateral outer end portion of the travel device TR on one side in the left-right direction of the body. For example, the outer end position of the air conditioner 75 on the left side of the body may also be on the left side of the body relative to the second left end position L2. That is, the lateral outer end of the air conditioner 75 may also be outward of the body in the left-right direction of the body with respect to the lateral outer end of the travel device TR on the left side of the body when the tread is the widest.

The tread changing device 23 need not be provided. That is, a configuration is also possible in which the tread of the left and right travel devices TR is unchangeable. Furthermore, in a configuration in which the tread of the left and right travel devices TR is unchangeable, the lateral outer end of the air conditioner 75 may be outward of the body in the left-right direction of the body relative to the lateral outer end portion of the travel device TR on the left side of the body, or may be toward the center of the body in the left-right direction of the body relative to the lateral outer end portion of the travel device TR on the left side of the body.

The air conditioner 75 may also be at a position lower than the upper end position of the travel device TR.

The air conditioner 75 may also be at a position higher than that of the fender 5.

The portion fixed by welding in the above-described preferred embodiment may also be fixed by any fixing method other than welding.

The horizontal portion 81*c* may also pass through the same height position as the driver's head in a side view, or may be pass through a position lower than the driver's head in a side view.

The arm portion 86 may also be not swingable. That is, the tractor 1 may be configured such that the position of the outlet 81*a* is unchangeable and the orientation of the outlet 81*a* is unchangeable.

The ducts 81 may also be in the form of members having no flexibility.

It should be noted that the configurations disclosed in the above-described preferred embodiments (including the alternative preferred embodiments, the same applies hereinafter) are applicable in combination with the configuration disclosed in alternative preferred embodiments as long as there is no contradiction. Moreover, the preferred embodiments disclosed in this specification are exemplary, and the preferred embodiments of the present invention are not limited thereto, and can be appropriately modified.

Preferred embodiments of the present invention and modifications thereof are usable not only in tractors but also in various work vehicles such as combine harvesters, rice transplanters, and construction work machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a driver section including a driver seat;
   an air conditioner for the driver section;
   a duct to supply conditioned air from the air conditioner; and
   a support to support the duct in the driver section and having a position and a shape at least one of which is changeable; wherein the air conditioner is below an upper end of the driver seat;

the duct includes:
- a vertical portion extending upward from the air conditioner and rearward of the driver seat; and
- a horizontal portion extending from an upper end portion of the vertical portion to a position forward of a driver in the driver seat in a plan view;

the duct includes, at a portion forward of the driver, an outlet to blow the conditioned air toward the driver;

the duct includes a flexible member;

the outlet has a position and an orientation at least one of which changes in response to a change in the support; and the support is changeable so as to extend in a front-rear direction at a position lateral to and above the driver's head.

2. The work vehicle according to claim 1, wherein the horizontal portion extends above the driver's head in a side view.

3. The work vehicle according to claim 1, wherein
the outlet is at a front end portion of the duct; and
a front portion of the duct is retractable to a position rearward of a front end portion of the driver seat in response to a change in the support.

4. The work vehicle according to claim 1, further comprising:
a roof portion covering the driver section from above; and
a roof frame supporting the roof portion; wherein
the support is supported by the roof frame.

5. The work vehicle according to claim 4, wherein
the roof portion is a canopy;
the work vehicle further comprises a protective frame at a rear portion of the driver section; and
the roof frame is supported by an upper portion of the protective frame.

6. A work vehicle comprising:
a driver section including a driver seat;
an air conditioner for the driver section;
a duct to supply conditioned air from the air conditioner; and
a protective frame at a rear portion of the driver section; wherein
the air conditioner is below an upper end of the driver seat;
the duct includes:
- a vertical portion extending upward from the air conditioner and rearward of the driver seat; and
- a horizontal portion extending from an upper end portion of the vertical portion to a position forward of a driver in the driver seat in a plan view;

the duct includes, at a portion forward of the driver, an outlet to blow the conditioned air toward the driver;

the protective frame has an orientation changeable between a standing use orientation and an inclined orientation, in which the protective frame is inclined rearward from the use orientation; and the vertical portion includes a flexible member, and is supported by the protective frame and extends along the protective frame.

* * * * *